United States Patent [19]

Hotka

[11] Patent Number: 5,452,415
[45] Date of Patent: Sep. 19, 1995

[54] METHOD AND SYSTEM FOR AUTOMATICALLY DISPLAYING AND CONFIGURING A NETWORK MONITORING SYSTEM

[75] Inventor: Michael A. Hotka, Garland, Tex.

[73] Assignee: Alcatel Network Systems, Inc., Richardson, Tex.

[21] Appl. No.: 858,296

[22] Filed: Mar. 26, 1992

[51] Int. Cl.⁶ .............................................. G06F 9/00
[52] U.S. Cl. ..................................... 395/161; 395/155
[58] Field of Search ............... 395/155, 158, 160, 161, 395/575; 364/146; 371/11.1, 16.1; 340/825.06, 825.17

[56] References Cited

U.S. PATENT DOCUMENTS

| | | | |
|---|---|---|---|
| 4,622,633 | 11/1986 | Ceccon et al. | 364/200 |
| 4,723,270 | 2/1988 | Okamoto et al. | 379/113 |
| 5,021,968 | 6/1991 | Ferketic | 395/161 X |
| 5,021,997 | 6/1991 | Archie et al. | 371/616.1 X |
| 5,230,078 | 7/1993 | Verela et al. | 340/825.06 X |
| 5,233,688 | 8/1993 | Too | 395/161 |
| 5,247,433 | 9/1993 | Kitaura et al. | 364/146 X |
| 5,263,167 | 11/1993 | Conner, Jr. et al. | 395/161 X |
| 5,265,241 | 11/1993 | Arnold et al. | 395/575 |
| 5,270,919 | 12/1993 | Blake et al. | 340/825.17 X |

FOREIGN PATENT DOCUMENTS 0274406 7/1988 European Pat. Off. .

*Primary Examiner*—Heather R. Herndon
*Assistant Examiner*—Cliff N. Vo
*Attorney, Agent, or Firm*—Baker & Botts

[57] ABSTRACT

A method and system that provides several pre-defined user templates that may be combined in various ways to represent all known network configurations of a digital cross-connect network. The system interrogates the user concerning the network configuration. The results of the interrogations determine the type of network monitor and control system configuration templates that the user will see. The system creates a database as a result of the combination of the templates and places on line the user templates and associated software to represent of the entire digital cross-connect network. This monitoring system can be used to not only vividly display the node from which a component error comes, but can illustrate the specific sub-component that provides the error and a representation of the various error lights that appear on the sub-component. The representation that the system displays appears on a computer screen and the accompanying software further allows the user to monitor, to replace, or add to remotely located patching devices in response to situations at the remote locations.

12 Claims, 8 Drawing Sheets

METHOD AND SYSTEM FOR AUTOMATICALLY DISPLAYING AND CONFIGURING A NETWORK MONITORING SYSTEM

NOTICE: COPYRIGHT (©) 1992 Alcatel Network Systems, Inc.

A portion of the disclosure of this patent document contains material which is subject to copyright protection. The copyright owner has no objection to the facsimile reproduction by anyone of the patent documents the patent disclosure as it appears in the patent and trademark office file of records, but otherwise reserves all copyright rights whatsoever.

TECHNICAL FIELD OF THE INVENTION

The present invention is concerned generally with electronics and more specifically with communications systems. Even more specifically, the invention is concerned with a method and system for describing the operational condition of a communications network monitoring system and includes the ability to automatically configure the communications network monitoring system at varying levels of complexity through the use of easy-to-understand user templates that a user may display on a computer screen.

BACKGROUND OF THE INVENTION

Digital cross-connect communications networks operate under the control of computer systems that use software to monitor and control the operation of the communications network components. A problem relating to effectively monitoring the communications network components using these computers is understanding the use of and the signals generated by the computer system software. Known network monitoring systems use numerous software programs and multiple databases to monitor and control even the simplest communications network.

If the configuration of the communications network changes, it is necessary for network system operators to change much of the data that relates to the network. The prior art systems make it necessary for operators to do significant data entry and track large amounts of data. These changes, however, require a high degree of system knowledge and technical skill for successful implementation. Skilled operators, however, are a limited resource, so there is a need for a method and system by which less-skilled users may effectively monitor a communications network without needing to perform extensive data entry or to track vast amounts of detailed data that the prior monitoring and controlling systems require.

There is no easy-to-use tool between the software that monitors and controls the communication network components and the typical operators responsible for these tasks. As a result, much operator error exists in monitoring and controlling digital cross-connect communications networks. These users need, in the event of a network failure, extensive technical support to maintain the network in a normal operating condition.

The present invention attempts to overcome the limitations of the prior art by providing a single tool to monitor and configure a digital cross-connect communications network by interfacing with the software that directly controls the network's individual components. In the event that a user seeks to reconfigure the communications network, add a new node to the communications network, or expand the capabilities of a node already existing in the communications network, the configuration system of the present invention automatically changes the data files to reflect the communications network status and control the software that interfaces the components. These operations take place without the need to directly use the numerous software tools or input large amounts of network data.

It is also an object of the present invention to provide a user-configurable system that provides a set of predefined templates that may be combined in various ways to represent all known network configurations of a digital cross-connect network. The present invention can be used with both large and small networks, because the size of the network affects only the variety of subcomponent devices or their permutations as separate elements in separate templates. The system interrogates the user and, from the results of the interrogations, either originally configures or adds to the network configuration a database that the system formulates as a result of combining the templates. The system then displays to the operator a video screen and software representation of the entire digital cross-connect communications network or any part thereof.

The present invention not only vividly displays an image of the node from which an error comes, but also illustrates the specific subcomponent entities that emit the error and may even display a representation of the various error lights of a remotely located device that is part of the node. An important feature of the monitor display to the user is that, together with the accompanying component controlling and monitoring software, it is possible for a user to patch into any defined node of the communications network to thereby permit efficient handling any emergency or failure situation at a patched into remote location.

By permitting a user to automatically configure a digital cross-connect communications network representation, the present invention minimizes operator error, reduces the need for technical support, and lessens the need for sophisticated training on the part of the system user. The system tracks its own changes and integrates with the other files that contain data relevant to the condition of the communications network. Finally, the system provides a flexible single system that can apply to a virtually unlimited number of communications network configurations and that eliminates the need for special tailoring of software control the individual communications components of a communications network.

BRIEF DESCRIPTION OF THE DRAWINGS

Other objects and advantages of the present invention will be apparent from a reading of the specification and appended claims in conjunction with the drawings wherei

DETAILED DESCRIPTION OF THE INVENTION

Figure 1:
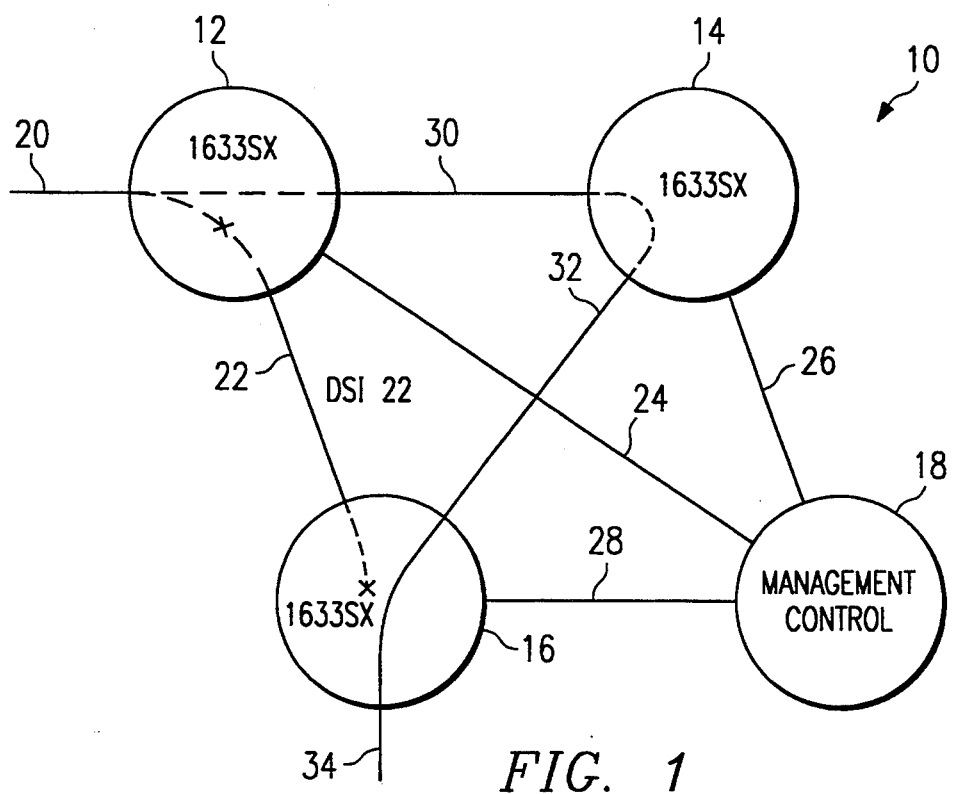
FIG. 1 is a possible digital cross-connect communications network configuration problem that the preferred embodiment of the present invention may assist to solve.

In FIG. 1, digital cross-connect communications network 10 may include communication nodes such as nodes 12, 14 and 16 which may be a 1633 SX Digital Cross-Connect communications node made by Alcatel Network Systems, Inc., and having the abbreviated label "1633 SX" in FIG. 1. Each of nodes 12, 14 and 16 may be controlled by a management controller such as manager controller 18. Suppose, for example, that communications line 20 goes to communications node 12. From communications node 12, a digital switching device that permits communications signals to pass from one node to another, such as DSI22 switch link 22 may connect to node 16. Suppose further that for some reason (e.g., something cutting an associated underground cable), the communications link 22 between node 12 and node 16 fails. Management controller 18 may control the operation of nodes 12, 14, and 16 by control connections 24, 26 and 28, respectively. Through system monitoring software, such as that provided for monitoring and controlling the 1633 SX node and sold by Advanced Computing Devices, Inc., (ACD), a system manager or user may determine that line 22 is severed. In response thereto, a user may direct management controller 18 to control connections first between node 12 and node 14 to establish a communications path 30 and then between nodes 14 and 16 to establish communications path 32. With this control, it is possible to maintain communications from input line 20 to output line 34 with minimal interruption.

The purpose of the method and system of the preferred embodiment is to make operations similar to the above example easier and faster. Additionally, the method and system make monitoring the signals from the ACD software much easier and potentially alert the user faster to the exact source of a network failure. The preferred embodiment achieves these results by providing templates to the operator that describe the operation of a communications network visually and that permit reconfiguring a communications network through using these templates. Additionally, the method and system provide to the user a set of visual indications that describe the operation of the system including indication of errors, warnings, threshold conditions, and normal system conditions. The discussion that follows describes the user templates and the communications node reconfiguration and control processes that the present invention makes possible.

Figure 2:
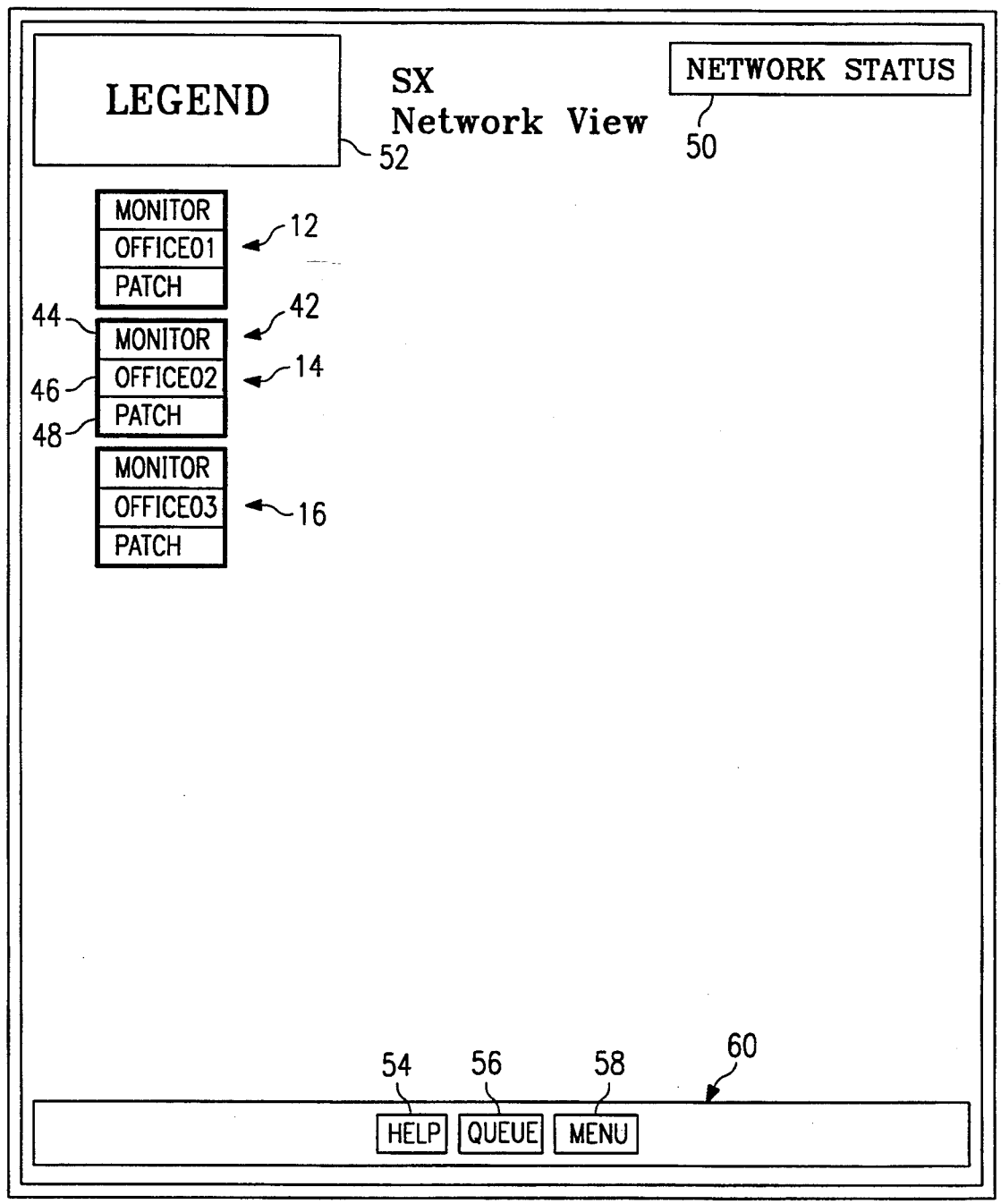
FIG. 2 is an alarm summary template that provides information that the present invention has the ability to provide.

In FIG. 2 appears alarm summary template 40 of the preferred embodiment that a user may view to monitor an entire digital cross-connect communications network. The preferred embodiment provides a color output that shows the status of each of the nodes or "offices" that may comprise a communications network such as network 10 of FIG. 1. For example, template 40 of FIG. 2 provides visual and audible data to describe the status of three offices through an OFFICE block for each office such as block 42 for OFFICE02. The preferred embodiment, however, has the ability to monitor and configure up to 39 offices. For example, alarm summary template 40 may monitor nodes 12, 14 and 16 of FIG. 1 as OFFICE01, OFFICE02, and OFFICE03 respectively. MONITOR sub-block 44 of OFFICE block 42 initiates a pop-up window to allow all real-time messages received from node 14 to be viewed by the user. OFFICE02 sub-block 46 provides a label for OFFICE block 42, and provides access to the bay template of OFFICE02. PATCH sub-block 48 initiates a pop-up window that remotely logs into node 14 and displays the 1633 SX main user interface menu. For example, the preferred embodiment facilitates performing the operations that FIG. 1 describes by permitting the user to patch into each office and use the 1633 SX menu system to reconnect the path.

Legend block 52 provides a color legend to indicate the meaning of each of the colors and other signals that alarm summary template 40 may generate. The system automatically adds legend block 52 to each screen as it displays alarm summary template 40. This facilitates changes to the legend and ensures that the system promulgates these changes to all the associated and appropriate templates. At the bottom of template 40, HELP icon 54, QUEUE icon 56 and MENU icon 58, all appear within template control block 60. HELP icon 54 permits access to a HELP function associated with alarm summary template 40, QUEUE icon 56 and MENU icon provide access to an operation menu for the control of the system of the preferred embodiment.

The alarm summary template 40 is a network summary screen that indicates on a single template the complete status of the nodes of a communications network that a user desires to monitor. Template 40 is dynamic in the sense that only the number of nodes that the user selects to configure are seen upon completion of the expansion scripts. As will be discussed later, the expansion scripts relate to the steps that a user undertakes to configure a digital cross-connect communications network. The colors of template 40 assist a user to determine the network status. For example, on alarm summary template 40, a the OFFICE02 text blinks red to indicate a critical/major error, yellow to indicate a minor error, green to indicate a threshold condition. The OFFICE02 text stay a solid green light to indicate a normal condition.

Figure 3:
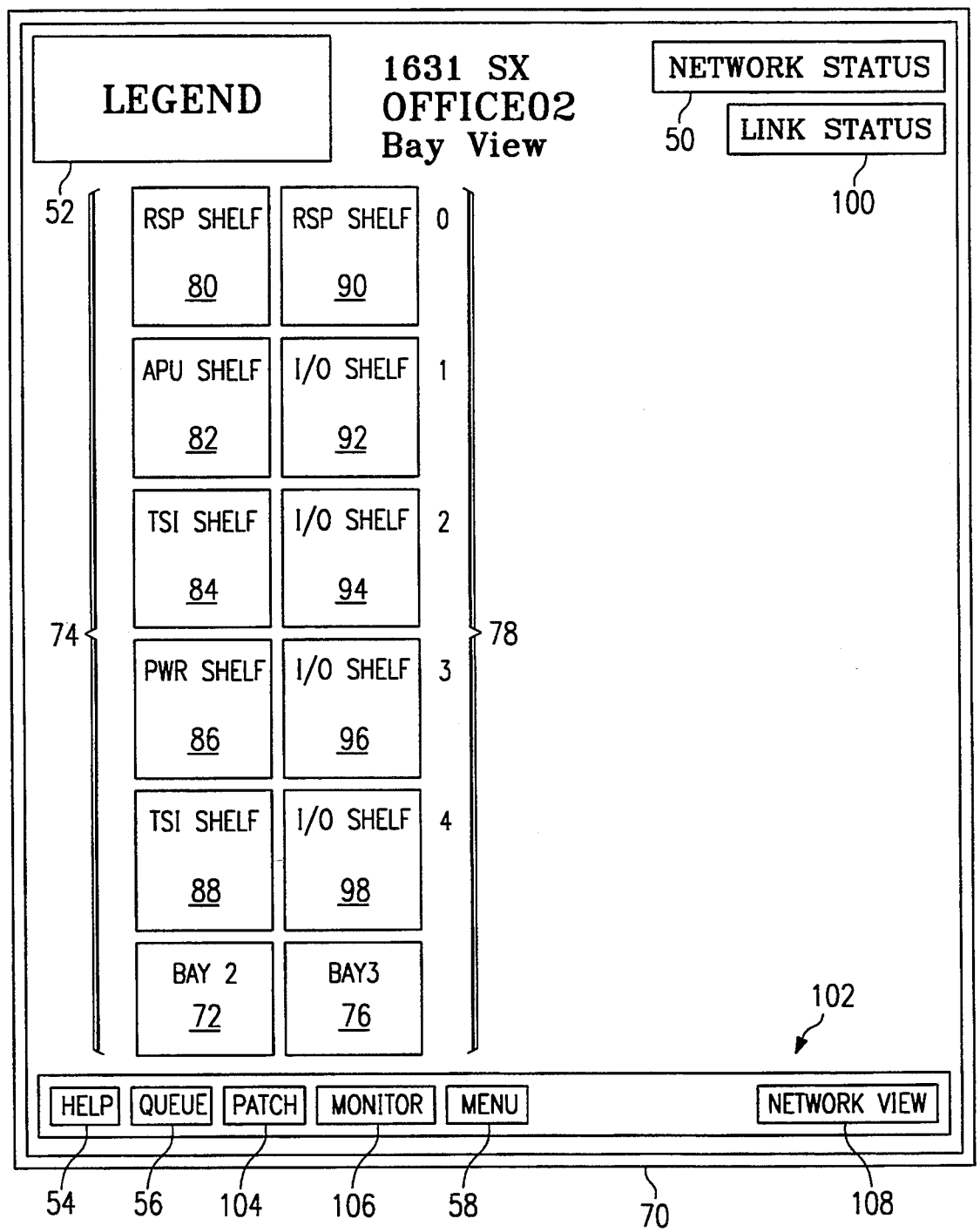
FIG. 3 is a communications bay template that is observable by manipulating the alarm summary template of FIG. 2.

In FIG. 3, bay template 70 shows the status of the operation of OFFICE02 that alarm summary template 40 of FIGURE02 monitors and block 42, for example. Bay template 70 shows that OFFICE02 includes two bays, Bay 2 designated at block 72 and including the shelves that bracket 74 bounds and Bay 3 designated by block 76 and including shelves that bracket 78 bounds. As used herewith, a bay is a portion of a communications node that consists of one or more shelves to have various subcomponents. Bay 2, for example, includes RSP shelf 80, APU shelf 82, TSI shelf 84, PWR shelf 86, and a second TSI shelf 88. Bay 3 includes RSP shelf 90, and I/O shelves 92, 94, 96, and 98.

The following table defines the acronyms for the components that support a digital cross-connection communications network.

| Acronym | Explanation |
| --- | --- |
| APS | Administrative Processing System |
| APU | Administrative Processing Unit Card |
| CS | Center Stage |
| DSI | Digital Signal Interface Card |
| I/O | Input/Output |
| IPU | Integrated Processing Unit Card |
| LTX | Line Termination |
| PSF | Power Supply Card |
| PWR | Power Card |
| TD | Tape/Disk |
| TSI | Time Slot Interchange Card |
| XCV | Transcalent Card |

As in FIG. 2, network status block 50 and legend block 52 communicate, respectively, the alarm status of the network and explanations of colors or other indications to assist the operator to understand the template 70 displays. Link status block 100 informs the operator of the status of the links between the various offices that alarm summary screen 40 monitors.

Block 102 of FIG. 3 is similar to block 60 of FIG. 2 and provides access to a HELP function via HELP icon 54, a queue function via QUEUE icon 56, a patch function via PATCH icon 104, a monitor function via MONITOR icon 106 and access to other portions of the system via MENU icon 58. NETWORK VIEW icon 108 permits the user to return to alarm summary templates 40 of FIG. 2.

Figure 4:
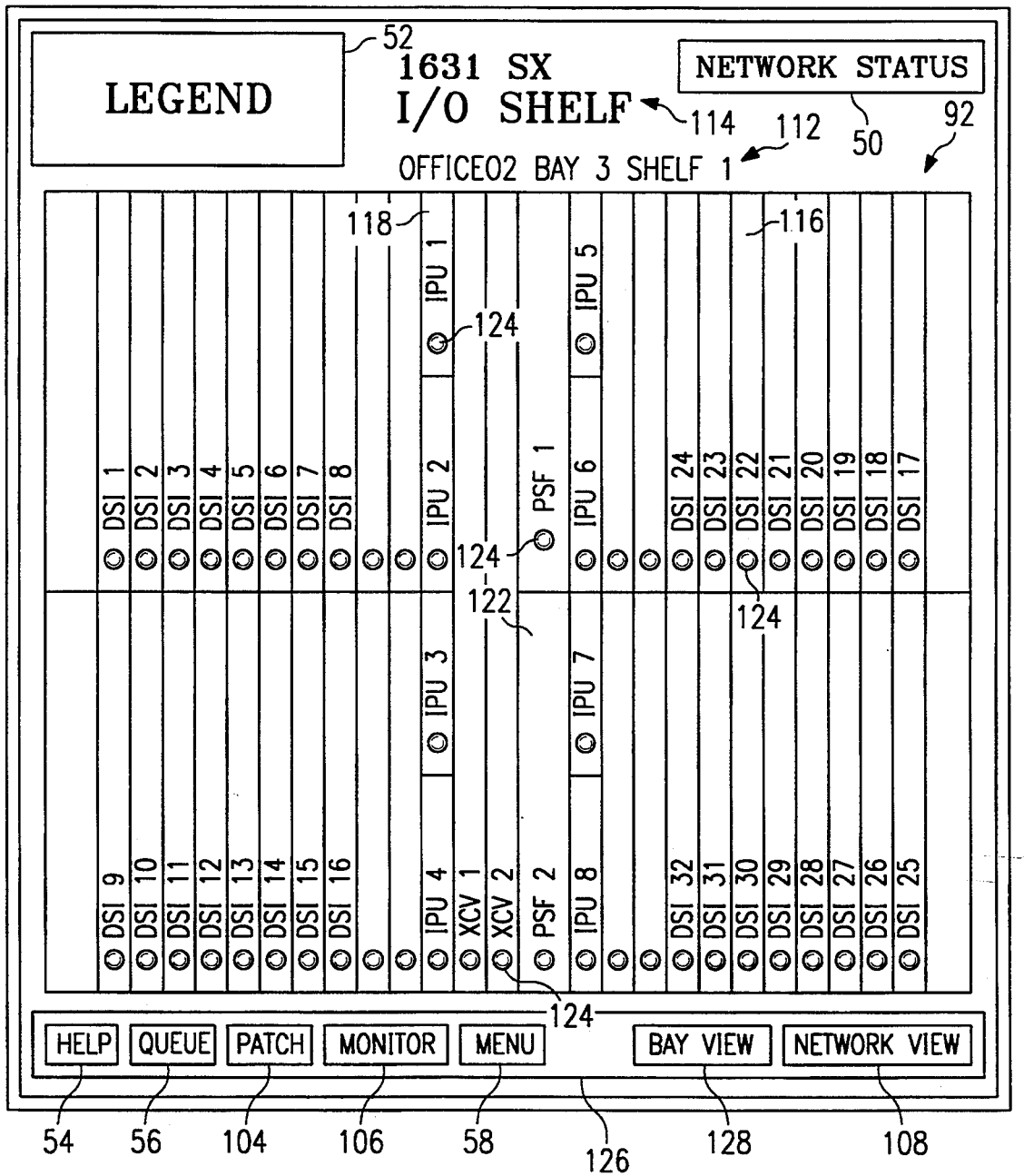
FIG. 4 is a shelf template that is observable by manipulating the bay template of FIG. 3.

In FIG. 4 appears I/O shelf representation 110 that more particularly shows the components of I/O shelf 92. Label 112 indicates that the display of shelf template 110 corresponds to OFFICE02 Bay 3 Shelf 1 which, in this case, corresponds to I/O shelf 92 of FIG. 3. Label 114 provides the name for the representation 110 as a "1631 SX I/0 SHELF." Legend block 52 and network status block 50 perform the functions previously described. Within I/O shelf 92 are numerous DSI modules, such as the DSI 22 module designated as 116. Additionally, I/O shelf 92 includes other switching and control units, such as IPU 1 unit 118, PSF 1 unit 120 and XCV 2 unit 122. On each device such as the DSI 22 module designated as 116, IPU 1 unit designated as 118, PSF 1 unit 120, and XCV 1 unit 122 appear indicators such as indicator 124. Each of these indicators 124 shows green, yellow or red depending on the status of the associated unit. Block 126 includes HELP icon 54, QUEUE icon 56, PATCH icon 104, MONITOR icon 106, and MENU icon 58, all to operate as previously described. Block 126 includes NETWORK VIEW icon 108 and BAY VIEW icon 128. NETWORK VIEW icon 108 permits the display of alarm summary template 40 and BAY VIEW icon 128 permits viewing bay template 70.

Alarm summary template 40 of FIG. 2, bay template 70 of FIG. 3, and I/O shelf template 110 of FIG. 4 relate with one another so as to indicate alarm conditions whenever one of the devices of I/O shelf 92 experiences an alarm condition. For example, suppose DSI 22 module 116 provides the connection between node 12 and node 14 of FIG. 1. If a disconnect exists with DSI 22 module 116, then an alarm condition will indicate at indicator 124 of DSI 22 module 116 in the I/O shelf template 110 of FIG. 4. Additionally, NETWORK STATUS light 50 of FIG. 4 will indicate the alarm condition by flashing the same color as indicator 124. For example, when the OFFICE02 that flashes red, so will the NETWORK STATUS light 50. The I/O shelf icon 92 will indicate flashing red on bay template 70 and NETWORK STATUS 50 also to indicate the flashing red. Furthermore, at alarm summary template 40, OFFICE02 will flash red indicating an alarm condition. On all three templates, alarm summary screen template 40, bay template 70, and I/O shelf template 110 NETWORK STATUS block 50 will flash red per our example of indicates 124 flashing red. If indicator 124 flashed yellow, then the template as described above would flash yellow.

The present invention takes the output of existing software that monitors the electronic component of a digital cross-connect network and provides to the user the reports and displays of network operation. By interfacing with appropriate control and monitor ACD software, the preferred embodiment provides the monitoring functions of FIGS. 2–4. Moreover, through the monitoring functions of FIGS. 2–4, it is possible to more accurately and reliably control the operation of the ACD software. The templates that FIGS. 2–4 show, for example, permit a user to configure the components that the ACD software controls by permitting a user to structure the elements of each of the templates.

The SX switch hardware generates alarm signals in what is known as the TLI format of the Bellcor alarm standard. For a TLI formatted alarm, the method and system of the present invention generate color-coded alarms that appear at each of the templates of FIGS. 2–4. A significant difference between the previous method of monitoring communication components and the method of the preferred embodiment is that the user supplies substantially fewer inputs to configure a network. This is because the prior network configuration methods require direct manipulation and access to a multiple of individual, but interrelated, program files. The user employs the present invention, on the other hand, to automatically input much of the previously manually input data. Additionally, a user may monitor and configure a communications network through the use of a dialogue that poses to the user certain queries and for which the user provides data and instructions for configuring and monitoring the communications network.

The following discussion relates to FIGS. 5 through 9 that show flow charts of the various configuring and communications network change functions of the method and system. For instance, the method and system of the preferred embodiment permit the user to completely change the graphical representation of the network upon demand. To achieve this functionality, the templates that represent 1633 SX bays and shelves have been reduced to templates. The templates represent all levels of integration necessary to configure a 1633 SX node. The templates include each bay representation that the 1633 SX supports and each kind of shelf of a 1633 SX bay. The bay templates of the preferred embodiment represent, for example, provide 64-port, 2-or 3-bay representations; 128-port, 2- or 3-bay representations; a 256-port representation with either an APU or an APS bay; a 512-port representation with either an APU or an APS bay; a 1024-port and 2048-port representation of a 1633 SX digital cross-connect network node. The user configuration process includes the ability to select these bay representations in either a right-growth or left-growth format. The terms right-growth and left-growth mean, respectively, that in such a system if another bay were added to the system, the template shows on the right, left side of the existing bays. This representation of the templates accurately reflect the hardware representation that user seeks to monitor. The 1633 SX shelf templates include a representation of the RSP, LTX, means line termination, APS, TD, means tape/disk, APU, I/O, CS, means center stage and PWR shelves.

The preferred embodiment may also provide all levels of integration necessary to conFIG. 1631 SX and 1630 SX Digital Cross-Connect communications networks.

The templates are used in a unique expansion technique where the user has complete control of the final graphic network representation of the system. During the reconfiguration process, the user is queried as to how to size the network. This sizing includes interrogating the user for the network node count, the port size of each node, the growth format of each node and the node name. Support files are then created which are used by the expansion scripts. The expansion scripts aid the system to accomplish its essential functions. Expansion scripts use information input by the user to configure the graphics templates of FIG. 2 through 4, above, that describe the communications network. The scripts enable the system to modify the templates and, by a process of duplication and modification, create bay and shelf templates such a templates 70 and 110, respectively having the correct register and screen link information. The modification process uses a batch editor to cut known patterns from the template files and replace these strings with the correct string to make the screen function properly. Some of the information that is modified includes the site name and the bay and shelf location of the template.

The user may configure the template at FIGS. 2 through 4 in various combinations so that the resulting set of templates accurately reflects the configuration of 1633 SX digital cross-connects, for example, in a digital cross-connect network. The system adjusts the templates so that by using standard utilities such as those that ACD provides to configure a network, a user may form a complete set from just a few templates styles. The templates and the expansion scheme of the preferred embodiment cause changes to all applicable graphic templates using only a few screen text files. Then, these changes are automatically expanded to the number of screens that the user requests during the configuration process. Thus, by editing a few files with the new changes, all the screens of this template type will automatically receive the same changes.

The method and system use a color coding scheme to help the user decide how to control the system. For example, the system encloses icons in a gray box to indicate a connection to a zoom screen, while icons in a magenta box indicate a query action.

The method and system permit the user to perform four essential functions to monitor and control a communications network. The first function is to install the system to communicate with the ACD software that controls the communications components of the digital cross-connect network. The second function is to reconfigure the entire system after initial installation. The third function is to add nodes to the system. The fourth is to resize the node to reflect a change in the size of node.

The reconfigure system command is used when the communications network is to be completely changed. Any previous configuration is completely erased and replaced by this new configuration. The user may initiate this process by entering a "Reconfigure the System" command to the system. The preferred embodiment allows the user to input this command by its selection from a utilities menu of available system utilities. Upon selecting the "Reconfigure the System" command, the user gains access to a sub-menu containing the three types of system configurations a user may perform with the preferred embodiment, including 1) reconfigure the system, 2) add one or more nodes to the network, or 3) resize one node. The following discussion highlights operator dialogue that the preferred embodiment provides and discusses the flow of each process through the use of respective flow charts or diagrams appearing in FIGS. 5–9.

Figure 5:
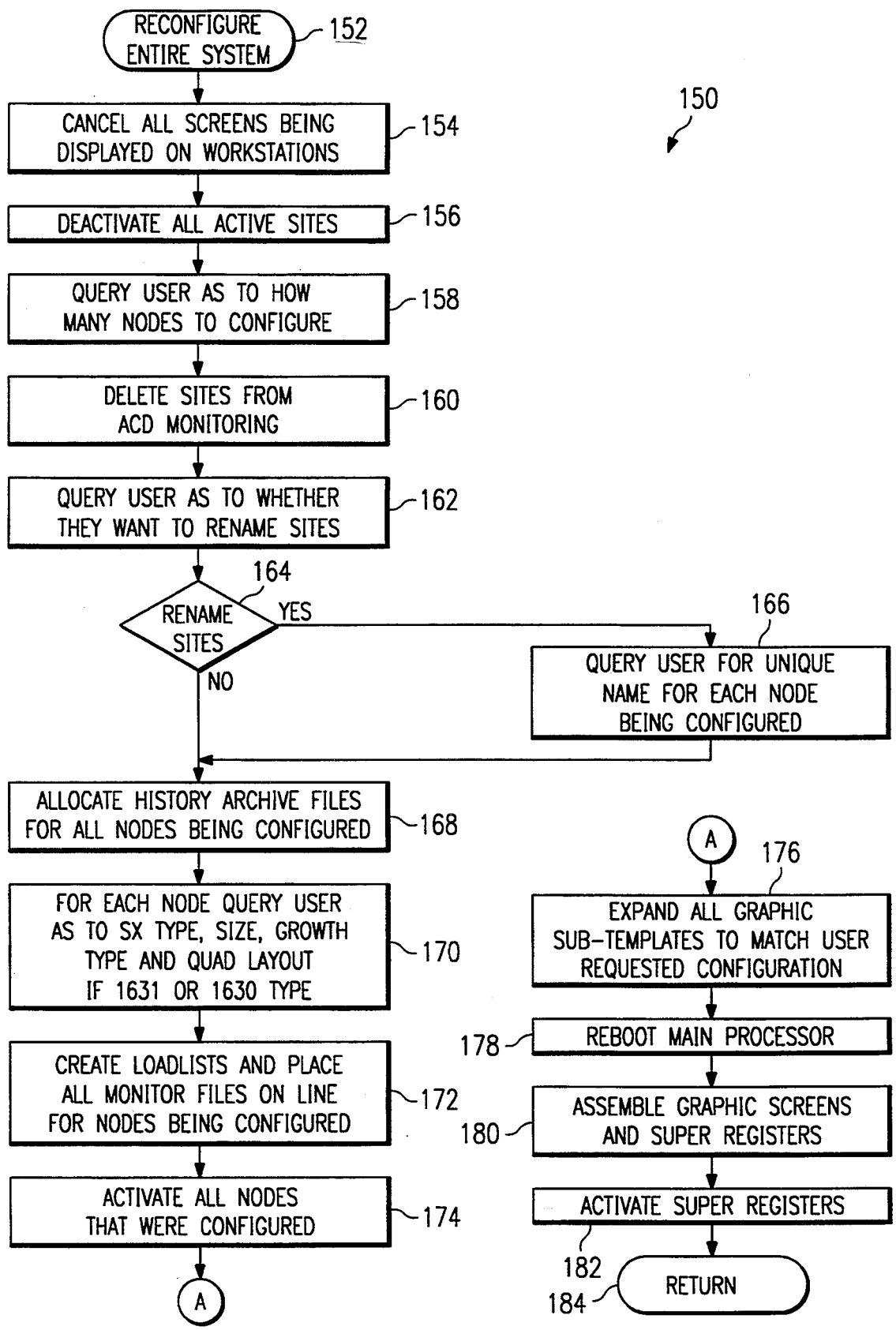
FIG. 5 is a flow chart of a method to reconfigure an entire communications network in accordance with the preferred embodiment.

In FIG. 5, reconfigure flow chart 150 shows that the reconfigure process begins with the reconfigure entire system step 152. Upon receiving this command, the host computer for the software performing the reconfiguration will cancel all screens being displayed on work stations at block 154. Then, at block 156, the reconfigure process deactivates all active sites. At block 158, the system queries the user as to how many nodes to reconfigure. Then, the reconfigure software process deletes the sites from the ACD controlling and monitoring software. After that, at block 162 the system queries the user as to whether they want to rename the sites. If they do, then at query response block 164, program flow goes to query the user for unique names for each node being configured, at block 166. If the rename sites query receives a "NO" answer, then at block 168 the system allocates history archive files for all nodes being configured. Next, for each node the system queries the operator as to the SX type, the size, the growth type, and quad layout if the SX is of the 1631 SX or 1630 SX type at block 170. At block 172, the system creates loadlists and places all monitor files on line for all nodes being configured. Then, at block 174 the system activates all nodes that were configured. At block 176, the system expands all graphic sub-templates to match the user requested configuration. The system reboots the main processor, then, at block 178 assembles graphic templates and Super Registers at step 180. Finally, at block 182 the reconfiguration process activates the Super Registers and resumes the monitoring function at block 184.

Figure 6:
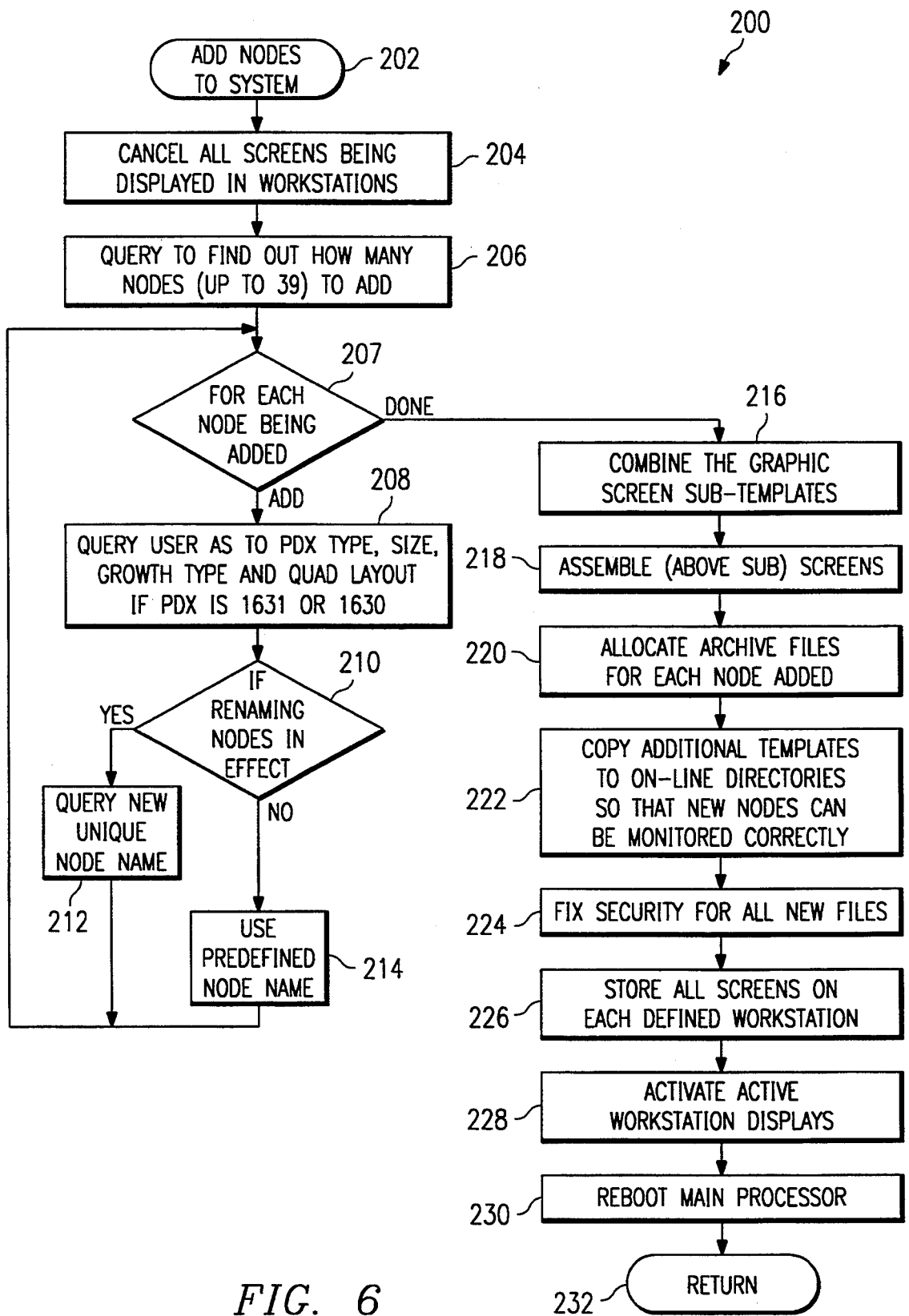
FIG. 6 is a flow chart of a method to add a node to a communications network according to the preferred embodiment.

FIG. 6 shows a flow chart 200 for using the preferred embodiment to add a node to a digital cross-connect communications network. For example, suppose that communications network has three nodes and a user seeks to add a fourth or fifth node to bring in two more cross-connects. Instead of having to reconfigure the entire system, the method and system permit the operator to simply add a node. Flow chart 200 shows the process for adding a node which begins at block 202. In response to the command to add nodes to the system, at block 204 the process cancels all screens being displayed on work stations and then queries the operator to find out how many nodes (up to 39 for the preferred embodiment) to add to the system at block 206. Then, for each node being added the process queries the operator as to the RDX type, the size, the growth type and the quad layout if the RDX is a 1631 or 1630 type at block 208. With this information, the system then uses the answer to a previous reconfiguration system rename node query to determine whether the renaming nodes is in effect at block 210. If so, then, at block 212, the system queries the user for the new unique node name. If not, then process uses the predefined node name at block 214. Then, the adding node procedure, for each node being added combines the graphic screen sub-templates at block 216 and assembles the screens at block 218. At block 220 the system allocates archive files for each node being added. Then, the next step is to copy additional templates to on-line directories so that new nodes may be monitored correctly at block 222. Fixing security for all new files is the next step at block 224. At block 226, the process stores all screens on each defined work station. Activating the active work station displays occurs at block 228. Finally, the adding node process reboots the system at block 230 and returns control to the MONITOR displays at block 232.

The Super Register expansion capability of the preferred method and system parallels the expansion of the graphic templates in the respect the user defines a network configuration. The graphic screens are expanded accordingly to represent the configuration as are the Super Registers, so that the summary registers on the various graphic templates properly reflect a lower level alarm status. "Super Registers" is an ACD trademark to describe a facility for reporting to a user the highest alarm status appearing in a communications network. A Super Register may contain various "base registers" and other "Super Registers" that associate with a particular graphic icon to reflects the status of the icon. "Base register" is also an ACD trademark. If a particular Super Register contains a base register that is reflecting a major alarm and another base register reflecting a minor alarm, the Super Register's status will be a major alarm indication. Both Super Registers and base registers allocate storage in the "MegaRay" (another ACD trademark). The MegaRay ties the receipt of event messages from the network to the change of status of graphic icons.

Super Registers are expanded with a series of scripts, similar to the expansion process for the graphic templates in the respect that only the appropriate base registers are added to the summary Super Registers, depending on the configuration that the user requests. Super Register expansion occurs after template expansion for a node has been completed. The set of Super Registers for a node depends on several factors including the kind of SX, the size of the node, whether performance monitoring icons are to be lit or not, the quad layout of the I/O shelves of a 1631 or 1630 SX node. This information was input by the user who configures the network. This information is kept in many files contained in a directory structure to support the present invention. The Super Register expansion process uses these files when appropriate to correctly expand the Super Registers to contain the exact base registers necessary for the Super Registers to function correctly.

Figure 7:
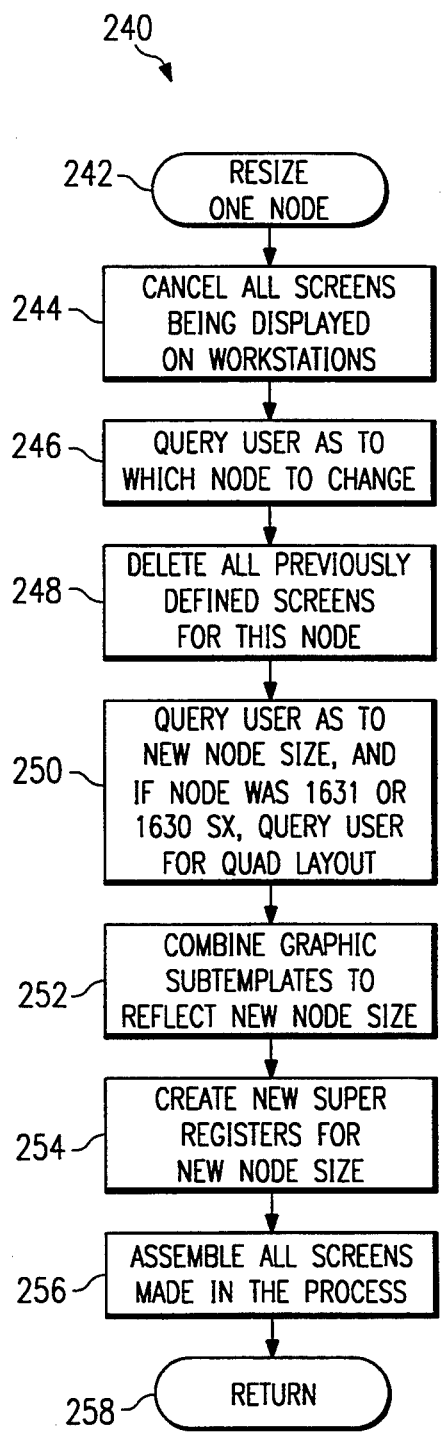
FIG. 7 is a flow chart of a method to resize one node of a communications network using the preferred embodiment.

In FIG. 7, flow chart 240 shows the process flow to resize one node of a network using of the preferred embodiment. The resize one node function has application, for example, in the situation where a user desires to expand a network node in capability but does not have the need to increase the number of nodes. This may be, for example, because the user expanded a node's capability to handle more circuits. If a single node is to expand, instead of reconfiguring the entire system, all that is necessary is to change the graphical representation of the system. This permits alarms, when they occur, to light on the associated ions correctly. Therefore, the resize one node function begins at block 242 which starts the process in response to a user command to resize one node. In response to block 242, at block 244 the system cancels all screens being displayed on the workstation and then queries the user, at block 246 as to which node to change. Note, in order to change a node it must have been previously defined. At block 248, the resize one node function deletes all previously defined screens for this node. At block 250, the system queries the user as to the new node size, and if the node was a 1631 SX or 1630 SX node, as well as for the quad layout. At block 252 the function combines graphic sub-templates to reflect the new node size. At block 254, the system creates new super registers for the new node size. Further, at block 256 the system assembles all templates made in the process and then at block 258 control returns to the monitoring functions.

Figure 8:
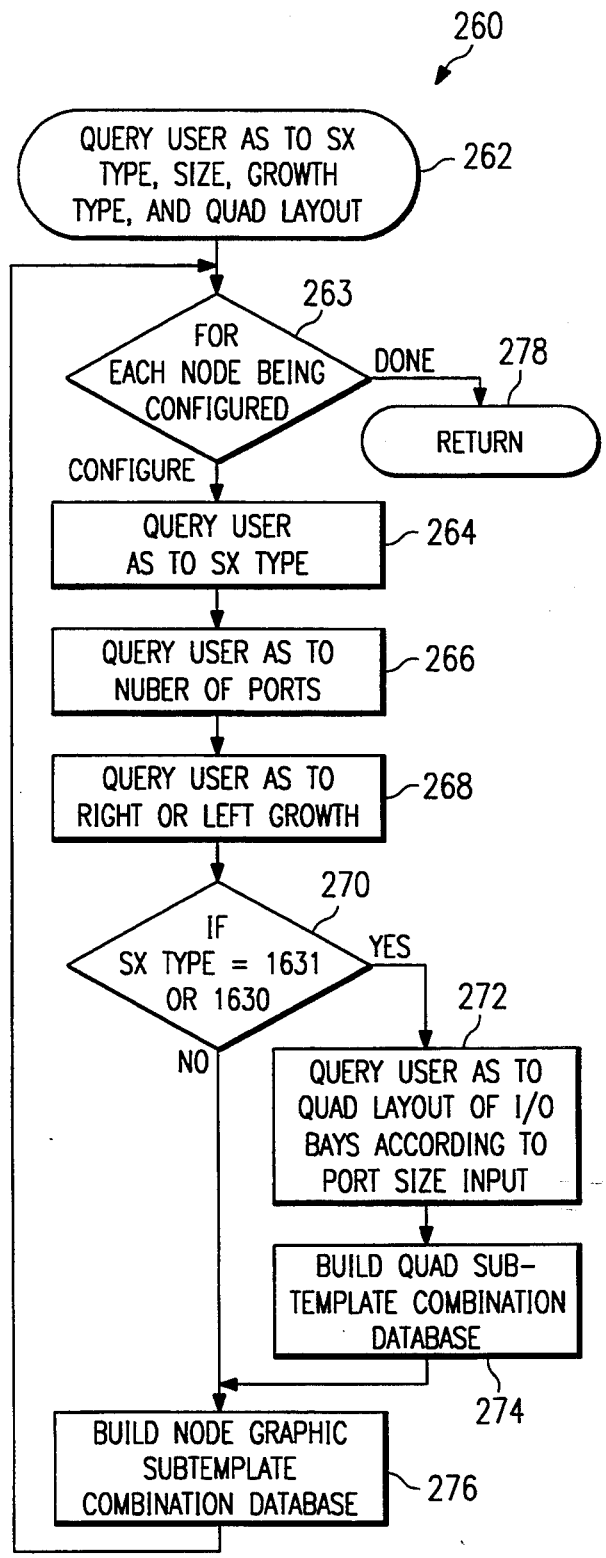
FIG. 8 provides a flow chart of the steps that the preferred embodiment takes to query a user as to certain parameters of a communications node in accordance with the preferred embodiment.
Figure 9:
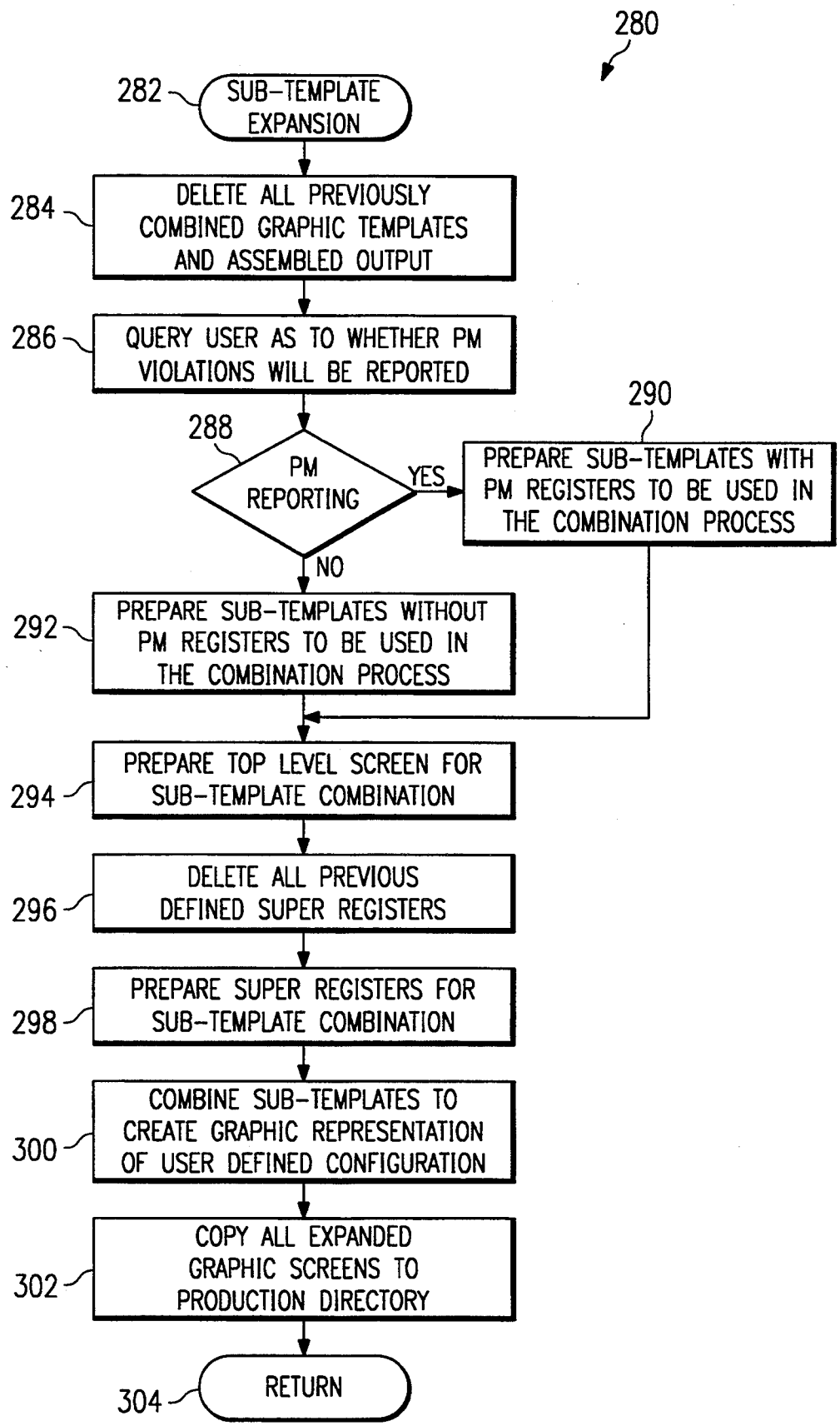
FIG. 9 is a flow chart of the method for subtemplate expansion according to the preferred embodiment of the preferred embodiment.

FIGS. 8 and 9 more particularly explain the operation of certain steps within the functions of FIGS. 5, 6 and 7. FIG. 8 provides flow chart 260 to show the steps that take place when the system queries the user as to the SX type, node size, growth type, and quad layout. If this query occurs, then program flow goes to block 262. At block 263, the program determines whether there are any nodes left to configure. If there are, the program loops and queries the user for information about each node being configured. The system first queries the user as to the SX type at block 264 and, then, the number of ports at block 266. At block 268, the step is to query the user as to the right or left growth characteristic that the user desires of the templates. If the SX type is 1631 or 1630, then query 270 directs program flow to block 272. At block 272, the system queries the operator as to the quad layout of the I/O bays according to the port size input. Then, at block 274 the process builds a quad sub-template combination database and goes to block 276. Program flow may also go to block 276 if the SX type is neither a 1631 SX or 1630 SX. At block 276, the process builds the node graphic sub-template combination database and causes flow to go to the next node, or, if all nodes have been addressed to return at block 278.

An important part of each of the functions of the preferred embodiment is sub-template expansion. In FIG. 9, flow chart 280 describes the program flow of the sub-template expansion functions of the preferred embodiment. Beginning at block 282, the sub-template expansion process goes to block 284 which deletes all previously combined graphic templates and assembled output. Next, at block 286 the process queries the user as to whether performance monitoring violations will be reported. If performance monitoring or PM reporting is to occur, then at query 288 program flow goes to block 290 which prepares sub-templates with performance monitoring registers to be used in the combination process. On the other hand, if performance monitoring reporting is not to occur, then at block 292, the function prepares sub-templates without performance monitoring registers to be used in the combination process. After either block 290 or 292, as appropriate, program flow continues to block 294 to prepare a top-level screen for sub-template combinations. Next, at block 296 the system deletes all previously defined super registers and at block 298 prepares super registers for sub-template combination. At block 300, the sub-template expansion function combines sub-templates to create graphic representations of the user-defined configuration. Then, at block 302, all expanded graphic templates are copied to a production directory and flow returns at block 304.

Although it is believed that the present specification and drawings fully and accurately described the system and provides sufficient information so that anyone skilled in the art may practice the inventive concept, we additionally include, as "Unpublished Appendix A" (as an appendix to remain unprinted) a copy of the working source code to enable a computer to operate as the network configuration control system that performs the functions of the flow chart of FIGS. 5-9 detailing the information necessary to permit the user to configure and monitor the network.

OPERATION

The information provided thus far in the background and detailed description tends to render the operation obvious to one skilled in the art. However, it is believed that a few comments relative to the operation and special features are still appropriate.

The method and system of the preferred embodiment permits a user such as a network system administrator to completely change the graphic representation of the network upon demand. There are four methods available to aid in the creation of network template representations. The four ways include: initial system configuration, configuring the entire system after the initial system configuration, appending new nodes to an existing network, and resizing an existing node. Each of these commands has an extensive user dialogue to query the user as to the exact representation of the configuration he desires. Once the user answers the interrogatories, the system executes appropriate template expansion scripts to achieve the network representation the users wants. Subsequent processing may also include creating new site control files and making them active, creating appropriate history files for new nodes, and placing any appropriate pre-defined report criteria files on-line.

To help illustrate the dialogue that a user sees and to identify the actions taking place in the dialogue, the following discussion lists the prompts that the user sees as indented from the left margin of the following text. Beginning in response to the command to reconfigure the system, the first prompt is,

DO YOU WISH TO PROCEED (Y/N)?

The above prompt allows the user to abort the reconfiguration without losing any previous configuration. If the user attempts to abort abnormally after this prompt, in the preferred embodiment, the system may be left in an undetermined state with respect to being able to correctly monitor a communications network.

Next, the system provides the following information to the user:

THE 2100 WORKSTATIONS CAN BE DISPLAYING GRAPHICS DURING THIS PROCESS. ALL SCREENS BEING DISPLAYED ON GSD DISPLAY WINDOWS WILL NOW BE CANCELLED BEFORE PROCEEDING.

INSTALL HOW MANY SX's (1-39)?

ANSWERING WHY TO RENAME THE CITES PROMPT ALLOWS THE USER OF CUSTOMER-DEFINED NAMES FOR THE SITES BEING MONITORED. ANSWERING N MAKES THE CITE NAMES 01 FOR SITE 1, ETC.

DO YOU WANT TO RENAME THE SITES (Y/N)?

If a Y is entered for the rename site prompt, then the system repeats the following line for as many nodes as there are in the system. If the user answers with an N, the systems names the sites OFFICE01 through OFFICEXX, where XX is a two-digit number that represents the number of nodes in the communications network. The node number that the system uses is the answer that the user has already provided to the "Install How Many SXs" prompt, above.

Next, the system prompts the user to,

ENTER NAME FOR SITE X (1-8 CHARS);

Here, X is a number from 1 to the number of nodes in the communications system. This node number (of defined nodes) also is the answer to the "Install How Many SXs" prompt. The site name that a user enters is tested for correct format and length. For example, in the preferred embodiment, the site name must start with an alphabetic character and may be followed by up to 7 alpha numeric characters. Also, the system checks the input site name for duplication. All site names in the communications network must be unique. Then, for each site, the system communicates with the user to configure a site beginning with the following dialogue:

CONFIGURE SITE X:

ENTER SX TYPE (33, 31, 310)?

If the type that the user enters is a 33 type, this indicates to the system that this node includes a 1633 SX digital cross-connect. Then, the system displays the following prompt:

ENTER #PORTS (64, 128, 256, 512, 1024, 2048)?

If the user desires a 64-port or 128-port 1633 SX, the system displays the following prompt:

ENTER #BAYS (2, 3) ?

This prompt is necessary because the 64-port and 128-port 1633 SX cross-connects may be configured in a 2- or 3-bay configuration. If the user desires a 256-port or 512-port 1633 SX, the system displays the following prompt.

DOES THIS SYSTEM CONTAIN ANAPU SHELF (Y/N)?

This prompt is necessary, because the 256-port and 512-port 1633 SX may be configured using an APU bay or an APS bay control system.

If the user enters 31 in response to the "ENTER SX TYPE" prompt, the system determines that the node contains a 1631 SX digital cross-connect. In response, the system displays the following prompt:

ENTER #PORTS (8, 16, 32, 64, 128, 256)?

If the type that the user enters in response to the "ENTER SX TYPE" prompt is 310, this indicates to the system that the node includes a 1630 SX digital crossconnect. In response, the system displays to the user the following prompt:

ENTER #PORTS (8, 16, 32) ?

Then the system irrespective of whether the user input a 33, 31, or a 310 in response to the "ENTER SX" prompt, will prompt the user as follows:

ENTER RIGHT OR LEFT-GROWTH REPRESENTATIONS (r,1)?

The system uses the above prompt lines for each site that the user configures. If the type of SX that the user selects is a 31 or 310 type, the system provides the following dialogue to configure the "QUADS" or four sections, of the I/O shelves that these systems contain. In other words, the I/O shelves of the 1631 and 1630 SX digital cross-connects are separated into four quadrants. The dialogue that the user receives to configure the QUADS starts with the prompt.

IS SX SYSTEM A MIX OF DSI AND LMU/HMU CARDS (Y/N)?:

This prompt facilitates filling the template expansion data base for the entire system. If the entire SX system is to be either filled with DS3s only or DS1s only, the user should answer N to this prompt. Answering Y causes the system to prompt the user for each I/O bay QUAD configuration. Now, if the user entered N to the previous prompt, the system provides the following prompt:

ENTER THE SYSTEM RESOURCE TYPE (ds3, ds1):

At this point, the screen expansion database for the system is correctly filled for the node that the user is configuring as either an entire DS3 system or a DS1 system. On the other hand, if a Y is entered to the "System Mix" prompt, the user may configure an entire bay in a similar fashion. For each bay of the node that the user configures, the user receives the following prompt:

IS BAY X A MIX OF DSI AND LMU/HMU CARDS (Y/N)?:

This prompt facilitates filling the screen expansion database for this entire bay. Each bay of the node that the user configures will be prompted in this fashion. The X is the I/O bay number for the bay being configurated. If the entire bay is to be either filled with DS3s only or DS1s only, the user should answer N to this prompt. Answering Y to this prompt directs the system to prompt the user for each I/O shelf QUAD configuration.

If in response to the previous "BAY MIX" prompt, the user answers N, the user receives the following prompt:

ENTER THE BAY RESOURCE TYPE (ds3, ds1);

At this point, the system has correctly filled the template expansion database for the bay that user is configuring as either an entire DS3 bay or a DS1 bay. On the other hand, if the user enters a Y to the "BAY MIX" prompt, the system requires that the user configure each shelf separately for the bay. Thus, for each bay shelf of the node that the user is configuring, the system prompts the user as follows:

CONFIGURE BAY X SHELF Y QUAD 1:
Enter QUAD 1 type (ds3, ds1, empty);
CONFIGURE BAY X SHELF Y QUAD 2:
Enter QUAD 2 type (ds3, ds1, empty):
CONFIGURE BAY X SHELF Y QUAD 3:
Enter QUAD 3 type (ds3, ds1, empty):
CONFIGURE BAY X SHELF Y QUAD 4:
Enter QUAD 4 type (ds3, ds1, empty):

Here X displays the current bay number that the user is configuring. The system controls this number by the size and type of SX that the user configures. The variable Y displays the current shelf that the user is configuring. The system controls this number by the size and type of SX that the system configures.

Upon responding to these prompts, the system provides to the user the following statements:

WAITING FOR HISTORY FILE ALLOCATION TO COMPLETE COPYING REPORTS, COMMANDS, QUERIES

CUSTOMER GRAPHICS CONSIST OF A SERIES OF LAYERED TOPICAL, NETWORK REPRESENTING, GRAPHICS. IF YOU HAVE THESE SCREENS, ANSWER Y.

DO YOU HAVE CUSTOM GRAPHICS (Y/N)?

The system uses the custom graphics prompts to back link the alarm summary template to any user/define graphics that may be layered above the SX network in the alarm summary template. The next response from the system is the following:

PERFORMANCE THRESHOLD CROSSING EVENTS WILL CAUSE THE ASSOCIATED ICON TO FLASH GREEN. IF YOU DESIRE THIS KIND OF MONITORING ON THE SX NODES, ANSWER Y.

DO YOU WANT SX PM ICONS TO LIGHT (Y)? The performance threshold crossing prompt controls whether the system creates additional registers to correctly reflect the receipt of performance monitoring events from the monitored network. Answering Y to this prompt causes the system to allocate the additional registers. Answering N, will prevent the ICONs of the templates of FIGS. 2-4 from reflecting the receipt of performance monitoring events from the communications network. At this point, the system will create screen names and display the file names for the screen that the system creates. Finally, the system will provide the following input:

SYSTEM IS NOW GOING TO REBOOT AUTOMATICALLY.

This completes the user dialogue for the reconfigure system process of the preferred embodiment. Although designed for the respective specific applications, the user dialogue for adding a node to a communications network and expanding an existing node of a communications network operate in a similar fashion.

In summary, the concept of the present invention is to provide a method for automatically configuring and monitoring a network comprising a plurality of components, the method including the steps of the associating a plurality of user templates with the plurality of levels of integration of the components so that a user template associates with each of the levels of integration and, then, further associating each of the user templates with other of the user templates to permit error conditions existing at one of said components to indicate a plurality of error signals on predetermined ones of the user templates and, further communicating instructions and queries through a display so that the instructions and queries associate with the error signals and the levels of integration, then configuring the network and response to the instructions, as well as altering the user templates and the levels of integration in response to the configuring of the network to finally display the altered templates to indicate the configured network and the altered levels of integration.

While a specific computer has not been illustrated for performing the present technique, it will be realized by those skilled in the art that any general purpose computer may be programmed in accordance with the flow of diagrams illustrated and that special purpose digital and analog computers may be designed specifically for implementing the present technique. Moreover, while a specific embodiment of the present invention has been disclosed, it is also to be realized by those skilled in the art that various other implementations may be originated to accomplish the inventive concepts of using a variety of interrelated user templates to control and monitor the component software for a digital cross-connect communications network. Thus, we wish to be limited only by the scope of the impending claims.

APPENDIX A

Module Name is activate_all_screens

```
/usr/mnsc/gsd/obj/stproc > /dev/null << EOF
request
alarm
cws1x1

EOF
/usr/mnsc/gsd/obj/stproc > /dev/null << EOF
request
alarm
cws2x1

EOF
/usr/mnsc/gsd/obj/stproc > /dev/null << EOF
request
alarm
cws3x1

EOF
/usr/mnsc/gsd/obj/stproc > /dev/null << EOF
request
alarm
cws4x1

EOF
/usr/mnsc/gsd/obj/stproc > /dev/null << EOF
request
alarm
cws5x1

EOF
/usr/mnsc/gsd/obj/stproc > /dev/null << EOF
request
alarm
cws6x1

EOF
/usr/mnsc/gsd/obj/stproc > /dev/null << EOF
request
alarm
cws7x1

EOF
/usr/mnsc/gsd/obj/stproc > /dev/null << EOF
request
alarm
cws8x1

EOF
```

Module Name is activate_sites

```
cd /usr/ava/install
/usr/mnsc/mla/obj/acproc > /dev/null << EOF
```

```
activate
c-mnsc

RIPU1

EOF
sleep 5
/usr/mnsc/mla/obj/acproc > /dev/null << EOF
activate
codex

RIPU1

EOF
for site in `cat .site_names`
do
/usr/mnsc/mla/obj/acproc > /dev/null << EOF
activate
$site

RIPU1

EOF
done

Module Name is build_scr file2=`cat /usr/ava/install/.quest_file`
rdxnum=$1
was=`pwd`
cd /usr/gsd/sys/symtab
rm -rf *
cd /usr/gsd/sys
rm valid
touch valid
cp /usr/ava/dev.gsd/ramsave /dev/gsd/ramsave
for i in `cat /usr/ava/install/.screen_names`
do
   rm -f /usr/gsd/screen/text/$i
   base=`basename $i .scr`
   rm -f /usr/gsd/screen/assemble/${base}
done
rm -f /usr/ava/install/.screen_names
touch /usr/ava/install/.screen_names
rm -f /usr/ava/install/scr_by_site/*
while :
do
   echo "   "
   echo "Custom Graphics consists of a series of layered topographical,"
   echo "network representing, graphic screens.  If you have these screens,"
   echo "answer Y."
   echo "   "
   echo -n "Do you have Custom Graphics (Y/N)? "
   echo "QUESTION: Do you have Custom Graphics?" >> $file2
   read choice
   echo "RESPONSE: $choice" >> $file2
   cd /usr/ava/screens/rdx33
   case $choice in
      Y | y | yes | YES)
         echo "1" > /usr/ava/install/.custom_flag
```

```
                custom=1
                break
                ;;
        N | n | no | NO)
                echo "0" > /usr/ava/install/.custom_flag
                custom=0
                break
                ;;
        *)
                echo "Invalid choice-Please try again"
                echo "PROMPT: Invalid choice-Please try again" >> $file2
                continue
        esac
done
while :
do
    echo "  "
    echo "Performance Threshold Crossing events will cause the associated"
    echo "Icon to flash green.  If you desire this kind of monitoring on"
    echo "the SX Nodes, answer Y."
    echo "  "
    echo -n "Do you want SX PM Icons to Light (Y/N)? "
    echo "QUESTION: Do you want SX PM Icons to Light?" >> $file2
    read choice echo "RESPONSE $choice" >> $file2
    case $choice is
        Y | y | yes | YES)
                echo "1" > /usr/ava/install/.pm_flag
                cd /usr/ava/screens/rdx310
                cp ./pm_violations/make_ixxx .
                cd /usr/ava/screens/rdx31
                cp ./pm_violations/make_ixxx .
                cd /usr/ava/super_registers/33
                cp ./pm_violations/* .
                cd /usr/ava/screens/rdx33
                cp ./pm_violations/r3i121.ori .
                break
                ;;
        N | n | no | NO)
                echo "0" > /usr/ava/install/.pm_flag
                cd /usr/ava/screens/rdx310
                cp ./non_pm/make_ixxx .
                cd /usr/ava/screens/rdx31
                cp ./non_pm/make_ixxx .
                cd /usr/ava/super_registers/33
                cp ./non_pm/* .
                cd /usr/ava/screens/rdx33
                cp ./non_pm/make_ixx11 .
                cp ./non_pm/r3i121.ori .
                break
                ;;
        *)
                echo "Invalid choice-Please try again"
                echo "PROMPT: Invalid choice-Please try again" >> $file2
                continue
        esac
done
cd /usr/ava/screens
./alarm_summary/make_alarm $custom
if [ ! -d /usr/gsd/sys/sr_definition/SR/MIA ]
then
    mkdir /usr/gsd/sys/sr_definition/SR/MIA
else
    cd /usr/gsd/sys/sr_definition/SR/MIA
    rm -f summary
    while read sitename
    do
```

```
    rm -f $sitename
  done < /usr/ava/install/.site_names.old
fi
cat /usr/ava/super_registers/network >> /usr/gsd/sys/sr_definition/SR/MIA/
summary cd /usr/ava/screens
cp rdx_cnfg.parms rdx_cnfg.parms.tmp
paste rdx_cnfg.parms.tmp /usr/ava/install/.site_names > rdx_cnfg.parms
rm  rdx_cnfg.parms.tmp make_screens 1
copy_screens
cd $was
```

Module Name is cancel_all_screens

```
/usr/mnsc/gsd/obj/stproc > /dev/null << EOF
cancel
all
cws1x1

EOF
/usr/mnsc/gsd/obj/stproc > /dev/null << EOF
request
wait
cws1x1

EOF
/usr/mnsc/gsd/obj/stproc > /dev/null << EOF
cancel
all
cws2x1

EOF
/usr/mnsc/gsd/obj/stproc > /dev/null << EOF
request
wait
cws2x1

EOF
/usr/mnsc/gsd/obj/stproc > /dev/null << EOF
cancel
all
cws3x1

EOF
/usr/mnsc/gsd/obj/stproc > /dev/null << EOF
request
wait
cws3x1

EOF
/usr/mnsc/gsd/obj/stproc > /dev/null << EOF
cancel
all
cws4x1
```

```
EOF
/usr/mnsc/gsd/obj/stproc > /dev/null << EOF
request
wait
cws4x1

EOF
/usr/mnsc/gsd/obj/stproc > /dev/null << EOF

/usr/mnsc/gsd/obj/stproc > /dev/null << EOF
cancel
all
cws5x1

EOF
/usr/mnsc/gsd/obj/stproc > /dev/null << EOF
request
wait
cws5x1

EOF
/usr/mnsc/gsd/obj/stproc > /dev/null << EOF
cancel
all
cws6x1

EOF
/usr/mnsc/gsd/obj/stproc > /dev/null << EOF
request
wait
cws6x1

EOF
/usr/mnsc/gsd/obj/stproc > /dev/null << EOF
cancel
all
cws7x1

EOF
/usr/mnsc/gsd/obj/stproc > /dev/null << EOF
request
wait
cws7x1

EOF
/usr/mnsc/gsd/obj/stproc > /dev/null << EOF
cancel
all
cws8x1

EOF
/usr/mnsc/gsd/obj/stproc > /dev/null << EOF
request
wait
cws8x1
```

```
EOF
/usr/mnsc/gsd/obj/stproc > /dev/null << EOF
cancel
all
cws1x2

EOF
/usr/mnsc/gsd/obj/stproc > /dev/null << EOF
request
wait
cws1x2

EOF
/usr/mnsc/gsd/obj/stproc > /dev/null << EOF
cancel
all
cws2x2

EOF
/usr/mnsc/gsd/obj/stproc > /dev/null << EOF
request
wait
cws2x2

EOF
/usr/mnsc/gsd/obj/stproc > /dev/null << EOF
cancel
all
cws3x2

EOF
/usr/mnsc/gsd/obj/stproc > /dev/null << EOF
request
wait
cws3x2

EOF
/usr/mnsc/gsd/obj/stproc > /dev/null << EOF
cancel
all
cws4x2

EOF
/usr/mnsc/gsd/obj/stproc > /dev/null << EOF
request
wait
cws4x2

EOF
/usr/mnsc/gsd/obj/stproc > /dev/null << EOF
/usr/mnsc/gsd/obj/stproc > /dev/null << EOF
cancel
all
cws5x2

EOF
```

```
/usr/mnsc/gsd/obj/stproc > /dev/null << EOF
request
wait
cws5x2

EOF
/usr/mnsc/gsd/obj/stproc > /dev/null << EOF
cancel
all
cws6x2

EOF
/usr/mnsc/gsd/obj/stproc > /dev/null << EOF
request
wait
cws6x2

EOF
/usr/mnsc/gsd/obj/stproc > /dev/null << EOF
cancel
all
cws7x2

EOF
/usr/mnsc/gsd/obj/stproc > /dev/null << EOF
request
wait
cws7x2

EOF
/usr/mnsc/gsd/obj/stproc > /dev/null << EOF
cancel
all
cws8x2

EOF
/usr/mnsc/gsd/obj/stproc > /dev/null << EOF
request
wait
cws8x2

EOF

Module Name is config_310_QUADS rdx=$1
bays=$2
file2=$3
while :
do
    echo -n "Is this SX system a mix of DSI and LMU/HMU cards (Y,N) ? : "
    echo "QUESTION: Is this SX system a mix...(Y,N) ? : " >> $file2
    read choice
    echo "RESPONSE: $choice" >> $file2
    case $choice in
    Y | y | yes | YES)
        if [ $bays -eq 0 ]
        then
            file1="/usr/ava/screens/rdx310/cnfg/.QUAD${rdx}x3"
```

```
        /usr/ava/install/config_io_shelf 3 1 $file1 $file2
elif [ $bays -eq 1 ]
then
    file1="/usr/ava/screens/rdx310/cnfg/.QUAD${rdx}x3"
    /usr/ava/install/config_io_shelf 3 1 $file1 $file2
    /usr/ava/install/config_io_shelf 3 2 $file1 $file2
elif [ $bays -eq 2 ]
then
    file1="/usr/ava/screens/rdx310/cnfg/.QUAD${rdx}x3"
    /usr/ava/install/config_io_shelf 3 1 $file1 $file2
    /usr/ava/install/config_io_shelf 3 2 $file1 $file2
    /usr/ava/install/config_io_shelf 3 3 $file1 $file2
    /usr/ava/install/config_io_shelf 3 4 $file1 $file2
elif [ $bays -eq 4 ]
then
    for i in 2 7
    do
        file1="/usr/ava/screens/rdx310/cnfg/.QUAD${rdx}x${i}"
        while :
        do
            echo -n "Is Bay $i a mix of DSI and LMU/HMU cards (Y,N) ? : "
            echo "QUESTION: Is Bay $i a mix...(Y,N) ? : " >> $file2
            read choice
            echo "RESPONSE: $choice" >> $file2
            case $choice in
            Y | y | yes | YES)
                /usr/ava/install/config_io_shelf $i 1 $file1 $file2
                /usr/ava/install/config_io_shelf $i 2 $file1 $file2
                /usr/ava/install/config_io_shelf $i 3 $file1 $file2
                /usr/ava/install/config_io_shelf $i 4 $file1 $file2
                break
                ;;
            N | n | no | NO)
                while :
                do
                    echo -n "Enter the Bay Resource Type (ds3,ds1) : "
                    echo "QUESTION:Enter the Bay Resource Type (ds3,ds1) : " >>S:
                    read choice
                    echo "RESPONSE: $choice" >> $file2
                    if [ "$choice" = "ds3" ]
                    then
                        type="3 3 3 3"
                        break
                    elif [ "$choice" = "ds1" ]
                    then
                        type="1 1 1 1"
                        break
                    else
                        echo "Invalid choice-Please try again"
                        echo "PROMPT: Invalid choice-Please try again" >> $file2
                        continue
                    fi
                done
                echo $type > $file1
                echo $type >> $file1
                echo $type >> $file1
                echo $type >> $file1
                break
                ;;
            *)
                echo "Invalid choice-Please try again"
                echo "PROMPT: Invalid choice-Please try again" >> $file2
                continue
            esac
        done
    done
elif [ $bays -eq 6 ]
then
    for i in 2 7 x y
```

```
    do
        file1="/usr/ava/screens/rdx310/cnfg/.QUAD${rdx}x${i}"
        while :
        do
            echo -n "Is Bay $i a mix of DSI and LMU/HMU cards (Y,N) ? : "
            echo "QUESTION: Is Bay $i a mix...(Y,N) ? : " >> $file2
            read choice
            echo "RESPONSE: $choice" >> $file2
            case $choice in
            Y | y | yes | YES)
                /usr/ava/install/config_io_shelf $i 1 $file1 $file2
                /usr/ava/install/config_io_shelf $i 2 $file1 $file2
                /usr/ava/install/config_io_shelf $i 3 $file1 $file2
                /usr/ava/install/config_io_shelf $i 4 $file1 $file2
                break
                ;;
            N | n | no | NO)
                while :
                do
                    echo -n "Enter the Bay Resource Type (ds3,ds1) : "
                    echo "QUESTION:Enter the Bay Resource Type (ds3,ds1) : " >> $f
                    read choice
                    echo "RESPONSE: $choice" >> $file2
                    if [ "$choice" = "ds3" ]
                    then
                        type="3 3 3 3"
                        break
                    elif [ "$choice" = "ds1" ]
                    then
                        type="1 1 1 1"
                        break
                    else
                        echo "Invalid choice-Please try again"
                        echo "PROMPT: Invalid choice-Please try again" >> $file2
                        continue
                    fi
                done
                echo $type > $file1
                echo $type >> $file1
                echo $type >> $file1
                echo $type >> $file1
                break
                ;;
            *)
                echo "Invalid choice-Please try again"
                echo "PROMPT: Invalid choice-Please try again" >> $file2
                continue
            esac
        done
    done
else
    for i in 2 7 x y a b c d
    do
        file1="/usr/ava/screens/rdx310/cnfg/.QUAD${rdx}x${i}"
        while :
        do
            echo -n "Is Bay $i a mix of DSI and LMU/HMU cards (Y,N) ? : "
            echo "QUESTION: Is Bay $i a mix...(Y,N) ? : " >> $file2
            read choice
            echo "RESPONSE: $choice" >> $file2
            case $choice in
            Y | y | yes | YES)
                /usr/ava/install/config_io_shelf $i 1 $file1 $file2
                /usr/ava/install/config_io_shelf $i 2 $file1 $file2
                /usr/ava/install/config_io_shelf $i 3 $file1 $file2
                /usr/ava/install/config_io_shelf $i 4 $file1 $file2
                break
                ;;
            N | n | no | NO)
```

```
                while :
                do
                    echo -n "Enter the Bay Resource Type (ds3,ds1) : "
                    echo "QUESTION:Enter the Bay Resource Type (ds3,ds1) : " >>$f
                    read choice
                    echo "RESPONSE: $choice" >> $file2
                    if [ "$choice" = "ds3" ]
                    then
                        type="3 3 3 3"
                        break
                    elif [ "$choice" = "ds1" ]
                    then
                        type="1 1 1 1"
                        break
                    else
                        echo "Invalid choice-Please try again"
                        echo "PROMPT: Invalid choice-Please try again" >> $file2
                        continue
                    fi
                done
                echo $type > $file1
                echo $type >> $file1
                echo $type >> $file1
                echo $type >> $file1
                break

*)
                echo "Invalid choice-Please try again"
                echo "PROMPT: Invalid choice-Please try again" >> $file2
                continue
            esac
        done
    done
fi
break
;;
N | n | no | NO)
    while :
    do
        echo -n "Enter the System Resource Type (ds3,ds1) : "
        echo "QUESTION:Enter the System Resource Type (ds3,ds1) : " >> $file2
        read choice
        echo "RESPONSE: $choice" >> $file2
        if [ "$choice" = "ds3" ]
        then
            type="3 3 3 3"
            break
        elif [ "$choice" = "ds1" ]
        then
            type="1 1 1 1"
            break
        else
            echo "Invalid choice-Please try again"
            echo "PROMPT: Invalid choice-Please try again" >> $file2
            continue
        fi
    done
    if [ $bays -eq 0 ]
    then
        file1="/usr/ava/screens/rdx310/cnfg/.QUAD${rdx}x3"
        echo $type > $file1
    elif [ $bays -eq 1 ]
    then
        file1="/usr/ava/screens/rdx310/cnfg/.QUAD${rdx}x3"
        echo $type > $file1
        echo $type >> $file1
```

```
    elif [ $bays -eq 2 ]
    then
        file1="/usr/ava/screens/rdx310/cnfg/.QUAD${rdx}x3"
        echo $type > $file1
        echo $type >> $file1
        echo $type >> $file1
        echo $type >> $file1
    elif [ $bays -eq 4 ]
    then
        for i in 2 7
        do
            file1="/usr/ava/screens/rdx310/cnfg/.QUAD${rdx}x${i}"
            echo $type > $file1
            echo $type >> $file1
            echo $type >> $file1
            echo $type >> $file1
        done
    elif [ $bays -eq 6 ]
    then
            for i in 2 7 x y
            do
                file1="/usr/ava/screens/rdx310/cnfg/.QUAD${rdx}x${i}"
                echo $type > $file1
                echo $type >> $file1
                echo $type >> $file1
                echo $type >> $file1
            done
        else
            for i in 2 7 x y a b c d
            do
                file1="/usr/ava/screens/rdx310/cnfg/.QUAD${rdx}x${i}"
                echo $type > $file1
                echo $type >> $file1
                echo $type >> $file1
                echo $type >> $file1
            done
        fi
        break
        ;;
    *)
        echo "Invalid choice-Please try again"
        echo "PROMPT: Invalid choice-Please try again" >> $file2
        continue
    esac
done Module Name is config_31_QUADS rdx=$1
bays=$2
file2=$3
while :
do
    echo -n "Is this SX system a mix of DSI and LMU/HMU cards (Y,N) ? : "
    echo "QUESTION: Is this SX system a mix...(Y,N) ? : " >> $file2
    read choice
    echo "RESPONSE: $choice" >> $file2
    case $choice in
    Y | y | yes | YES)
        if [ $bays -eq 0 ]
        then
            file1="/usr/ava/screens/rdx31/cnfg/.QUAD${rdx}x3"
            /usr/ava/install/config_io_shelf 3 1 $file1 $file2
        elif [ $bays -eq 1 ]
        then
            file1="/usr/ava/screens/rdx31/cnfg/.QUAD${rdx}x3"
```

```
        /usr/ava/install/config_io_shelf 3 1 $file1 $file2
        /usr/ava/install/config_io_shelf 3 2 $file1 $file2
elif [ $bays -eq 2 ]
then
    file1="/usr/ava/screens/rdx31/cnfg/.QUAD${rdx}x3"
        /usr/ava/install/config_io_shelf 3 1 $file1 $file2
        /usr/ava/install/config_io_shelf 3 2 $file1 $file2
        /usr/ava/install/config_io_shelf 3 3 $file1 $file2
        /usr/ava/install/config_io_shelf 3 4 $file1 $file2
elif [ $bays -eq 4 ]
then
    for i in 3 4
    do
        file1="/usr/ava/screens/rdx31/cnfg/.QUAD${rdx}x${i}"
        while :
        do
            echo -n "Is Bay $i a mix of DSI and LMU/HMU cards (Y,N) ? : "
            echo "QUESTION: Is Bay $i a mix...(Y,N) ? : " >> $file2
            read choice
            echo "RESPONSE: $choice" >> $file2
            case $choice in
            Y | y | yes | YES)
                /usr/ava/install/config_io_shelf $i 1 $file1 $file2
                /usr/ava/install/config_io_shelf $i 2 $file1 $file2
                /usr/ava/install/config_io_shelf $i 3 $file1 $file2
                /usr/ava/install/config_io_shelf $i 4 $file1 $file2
                break
                ;;
            N | n | no | NO)
                while :
                do
                    echo -n "Enter the Bay Resource Type (ds3,ds1) : "
                    echo "QUESTION: Enter the Bay Resource Type (ds3,ds1) : " >>$
                    read choice
                    echo "RESPONSE: $choice" >> $file2
                    if [ "$choice" = "ds3" ]
                    then
                        type="3 3 3 3"
                        break
                    elif [ "$choice" = "ds1" ]
                    then
                        type="1 1 1 1"
                        break
                    else
                        echo "Invalid choice-Please try again"
                        echo "PROMPT: Invalid choice-Please try again" >> $file2
                        continue
                    fi
                done
                echo $type > $file1
                echo $type >> $file1
                echo $type >> $file1
                echo $type >> $file1
                break
                ;;
            *)
                echo "Invalid choice-Please try again"
                echo "PROMPT: Invalid choice-Please try again" >> $file2
                continue
            esac
        done
    done
elif [ $bays -eq 6 ]
then
    for i in 3 4 5 6
    do
        file1="/usr/ava/screens/rdx31/cnfg/.QUAD${rdx}x${i}"
        while :
        do
```

```
echo -n "Is Bay $i a mix of DSI and LMU/HMU cards (Y,N) ? : "
echo "QUESTION: Is Bay $i a mix...(Y,N) ? : " >> $file2
read choice
echo "RESPONSE: $choice" >> $file2
case $choice in
Y | y | yes | YES)
    /usr/ava/install/config_io_shelf $i 1 $file1 $file2
    /usr/ava/install/config_io_shelf $i 2 $file1 $file2
    /usr/ava/install/config_io_shelf $i 3 $file1 $file2
    /usr/ava/install/config_io_shelf $i 4 $file1 $file2
    break
    ;;
N | n | no | NO)
    while :
    do
        echo -n "Enter the Bay Resource Type (ds3,ds1) : "
        echo "QUESTION: Enter the Bay Resource Type (ds3,ds1) : " >>$f
        read choice
        echo "RESPONSE: $choice" >> $file2
        if [ "$choice" = "ds3" ]
        then
            type="3 3 3 3"
            break
        elif [ "$choice" = "ds1" ]
        then
            type="1 1 1 1"
            break
        else
            echo "Invalid choice-Please try again"
            echo "PROMPT: Invalid choice-Please try again" >> $file2 continue
            fi
        done
        echo $type > $file1
        echo $type >> $file1
        echo $type >> $file1
        echo $type >> $file1
        break
        ;;
    *)
        echo "Invalid choice-Please try again"
        echo "PROMPT: Invalid choice-Please try again" >> $file2
        continue
    esac
    done
done
else
    for i in 3 4 5 6 10 11 12 13
    do
        file1="/usr/ava/screens/rdx31/cnfg/.QUAD${rdx}x${i}"
        while :
        do
            echo -n "Is Bay $i a mix of DSI and LMU/HMU cards (Y,N) ? : "
            echo "QUESTION: Is Bay $i a mix...(Y,N) ? : " >> $file2
            read choice
            echo "RESPONSE: $choice" >> $file2
            case $choice in
            Y | y | yes | YES)
                /usr/ava/install/config_io_shelf $i 1 $file1 $file2
                /usr/ava/install/config_io_shelf $i 2 $file1 $file2
                /usr/ava/install/config_io_shelf $i 3 $file1 $file2
                /usr/ava/install/config_io_shelf $i 4 $file1 $file2
                break
                ;;
            N | n | no | NO)
                while :
                do
                    echo -n "Enter the Bay Resource Type (ds3,ds1) : "
```

```
            echo "QUESTION: Enter the Bay Resource Type (ds3,ds1) : " >> $f
            read choice
            echo "RESPONSE: $choice" >> $file2
            if [ "$choice" = "ds3" ]
            then
                type="3 3 3 3"
                break
            elif [ "$choice" = "ds1" ]
            then
                type="1 1 1 1"
                break
            else
                echo "Invalid choice-Please try again"
                echo "PROMPT: Invalid choice-Please try again" >> $file2
                continue
            fi
        done
        echo $type > $file1
        echo $type >> $file1
        echo $type >> $file1
        echo $type >> $file1
        break ;;
            *)
                echo "Invalid choice-Please try again"
                echo "PROMPT: Invalid choice-Please try again" >> $file2
                continue
            esac
        done
    done
  fi
  break
  ;;
N | n | no | NO)
    while :
    do
        echo -n "Enter the System Resource Type (ds3,ds1) : "
        echo "QUESTION: Enter the System Resource Type (ds3,ds1) : " >> $file2
        read choice
        echo "RESPONSE: $choice" >> $file2
        if [ "$choice" = "ds3" ]
        then
            type="3 3 3 3"
            break
        elif [ "$choice" = "ds1" ]
        then
            type="1 1 1 1"
            break
        else
            echo "Invalid choice-Please try again"
            echo "PROMPT: Invalid choice-Please try again" >> $file2
            continue
        fi
    done
    if [ $bays -eq 0 ]
    then
        file1="/usr/ava/screens/rdx31/cnfg/.QUAD${rdx}x3"
        echo $type > $file1
    elif [ $bays -eq 1 ]
    then
        file1="/usr/ava/screens/rdx31/cnfg/.QUAD${rdx}x3"
        echo $type > $file1
        echo $type >> $file1
    elif [ $bays -eq 2 ]
    then
        file1="/usr/ava/screens/rdx31/cnfg/.QUAD${rdx}x3"
        echo $type > $file1
        echo $type >> $file1
```

```
        echo $type >> $file1
        echo $type >> $file1
    elif [ $bays -eq 4 ]
    then
        for i in 3 4
        do
            file1="/usr/ava/screens/rdx31/cnfg/.QUAD${rdx}x${i}"
            echo $type > $file1
            echo $type >> $file1
            echo $type >> $file1
            echo $type >> $file1
        done
    elif [ $bays -eq 6 ]
    then
            for i in 3 4 5 6
            do
                file1="/usr/ava/screens/rdx31/cnfg/.QUAD${rdx}x${i}"
                echo $type > $file1
                echo $type >> $file1
                echo $type >> $file1
                echo $type >> $file1
            done
        else
            for i in 3 4 5 6 10 11 12 13
            do
                file1="/usr/ava/screens/rdx31/cnfg/.QUAD${rdx}x${i}"
                echo $type > $file1
                echo $type >> $file1
                echo $type >> $file1
                echo $type >> $file1
            done
        fi
        break
        ;;
    *)
        echo "Invalid choice-Please try again"
        echo "PROMPT: Invalid choice-Please try again" >> $file2
        continue
    esac
done Module Name is config_FEPS rdxnum=$1
feps=`expr "$rdxnum" / 4`
rmdr=`expr "$rdxnum" % 4`
if [ "$rmdr" -ne 0 ]
then
    feps=`expr "$feps" + 1`
fi
file1=`cat /usr/ava/install/.quest_file`
cp /usr/com/sys/loadlist /usr/com/sys/preAVA
cp /usr/com/sys/parm /usr/com/sys/preAVA
cp /usr/com/sys/mnsc_load /usr/com/sys/preAVA
cp /usr/ml2/sys/loadlist /usr/ml2/sys/preAVA
cp /usr/mla/sys/parm /usr/mla/sys/preAVA
cp /acd/hosts.boot /acd/preAVA rm -f /usr/mla/stdylb/cfile/*
cp /usr/ava/usr.mla.stdylb.cfile/c-mnsc /usr/mla/stdylb/cfile
cp /usr/ava/usr.mla.stdylb.cfile/codex /usr/mla/stdylb/cfile
cp /usr/ava/usr.mla.sys/parm /usr/mla/sys/parm if [ $rdxnum -le 19 ]
then
    cp /usr/ava/acd/hosts.boot19 /acd/hosts.boot
    cp /usr/ava/usr.com.sys/parm/parm.19 /usr/com/sys/parm
```

```
    cp /usr/ava/usr.com.sys/loadlist/loadlist.19.${feps} /usr/com/sys/loadlist
    cp /usr/ava/usr.com.sys/mnsc_load/mnsc_load.19.${feps} /usr/com/sys/mnsc_load
else
    cp /usr/ava/acd/hosts.boot39 /acd/hosts.boot
    cp /usr/ava/usr.com.sys/parm/parm.39 /usr/com/sys/parm
    cp /usr/ava/usr.com.sys/loadlist/loadlist.39.${feps} /usr/com/sys/loadlist
    cp /usr/ava/usr.com.sys/mnsc_load/mnsc_load.39.${feps} /usr/com/sys/mnsc_load
fi
/usr/ava/usr.ml2.sys/make_loadlist $rdxnum
/usr/ava/install/chmod 777 /usr/com/sys/parm
while read node type bays growth name
do
    if [ $type -eq 3 ]
    then
        if [ $rdxnum -le 19 ]
        then
            copydir=/usr/ava/usr.mla.stdylb.cfile/rdx33/19
        else
            copydir=/usr/ava/usr.mla.stdylb.cfile/rdx33/39
        fi
    fi
    if [ $type -eq 1 ]
    then
        if [ $rdxnum -le 19 ]
        then
            copydir=/usr/ava/usr.mla.stdylb.cfile/rdx31/19
        else
            copydir=/usr/ava/usr.mla.stdylb.cfile/rdx31/39
        fi
    fi
    if [ $type -eq 0 ]
    then
        if [ $rdxnum -le 19 ]

then
            copydir=/usr/ava/usr.mla.stdylb.cfile/rdx310/19
        else
            copydir=/usr/ava/usr.mla.stdylb.cfile/rdx310/39
        fi
    fi
    /usr/ava/install/copy_cfile $copydir $node
done < /usr/ava/screens/rdx_cnfg.parms
/usr/ava/install/edit_cfile Module Name is config_io_shelf bay=$1
shelf=$2
file1=$3
file2=$4
echo "Configure BAY ${bay} SHELF ${shelf} QUAD 1 : "
echo "Configure BAY ${bay} SHELF ${shelf} QUAD 1 : " >> $file2
while :
do
    echo -n "Enter QUAD 1 Type (ds3,ds1,empty) : "
    echo "QUESTION: Enter QUAD 1 Type (ds3,ds1,empty) : " >> $file2
    read choice
    echo "RESPONSE: $choice" >> $file2
    if [ "$choice" = "ds3" ]
    then
        type="3 "
        break
    elif [ "$choice" = "ds1" ]
    then
        type="1 "
        break
```

```
        elif [ "$choice" = "empty" ]
        then
            type="0 "
            break
        else
            echo "Invalid choice-Please try again"
            echo "PROMPT: Invalid choice-Please try again" >> $file2
            continue
        fi
done
echo "Configure BAY ${bay} SHELF ${shelf} QUAD 2 : "
echo "Configure BAY ${bay} SHELF ${shelf} QUAD 2 : " >> $file2
while :
do
    echo -n "Enter QUAD 2 Type (ds3,dsl,empty) : "
    echo "QUESTION: Enter QUAD 2 Type (ds3,dsl,empty) : " >> $file2
    read choice
    echo "RESPONSE: $choice" >> $file2
    if [ "$choice" = "ds3" ]
    then
        type=$type"3 "
        break
    elif [ "$choice" = "dsl" ]
    then
        type=$type"1 "
        break
    elif [ "$choice" = "empty" ]
    then
        type=$type"0 "
        break
    else
        echo "Invalid choice-Please try again"
        echo "PROMPT: Invalid choice-Please try again" >> $file2
        continue
    fi
done
echo "Configure BAY ${bay} SHELF ${shelf} QUAD 3 : "
echo "Configure BAY ${bay} SHELF ${shelf} QUAD 3 :   >> $file2
while :
do
    echo -n "Enter QUAD 3 Type (ds3,dsl,empty) : "
    echo "QUESTION: Enter QUAD 3 Type (ds3,dsl,empty) : " >> $file2
    read choice
    echo "RESPONSE: $choice" >> $file2
    if [ "$choice" = "ds3" ]
    then
        type=$type"3 "
        break
    elif [ "$choice" = "dsl" ]
    then
        type=$type"1 "
        break
    elif [ "$choice" = "empty" ]
    then
        type=$type"0 "
        break
    else
        echo "Invalid choice-Please try again"
        echo "PROMPT: Invalid choice-Please try again" >> $file2
        continue
    fi
done
echo "Configure BAY ${bay} SHELF ${shelf} QUAD 4 : "
echo "Configure BAY ${bay} SHELF ${shelf} QUAD 4 : " >> $file2
while :
```

```
do
    echo -n "Enter QUAD 4 Type (ds3,ds1,empty) : "
    echo "QUESTION: Enter QUAD 4 Type (ds3,ds1,empty) : " >> $file2
    read choice
    echo "RESPONSE: $choice" >> $file2
    if [ "$choice" = "ds3" ]
    then
        type=$type"3 "
        break
    elif [ "$choice" = "ds1" ]
    then
        type=$type"1 "
        break
    elif [ "$choice" = "empty" ]
    then
        type=$type"0 "
        break
    else
        echo "Invalid choice-Please try again"
        echo "PROMPT: Invalid choice-Please try again" >> $file2
        continue
    fi
done
echo $type >> $file1
```

Module Name is config_lprs

```
file1=`cat /usr/ava/install/.quest_file`
echo "/dev/tty53" > /usr/customer/sys/prt_cnfg
echo "/dev/tty54" >> /usr/customer/sys/prt_cnfg
umask 0
rm -f /dev/sys_printer
ln -s /dev/tty54 /dev/sys_printer
umask 22
while :
do
    cd /usr/ava/usr.com.sys/loadlist
    echo -n "Is there a second system line printer (Y/N)? "
    echo "QUESTION: Is there a second system line printer (Y/N)? " >> $file1
    read choice
    echo "RESPONSE: $choice " >> $file1
    case $choice in
        Y | y | yes | YES)
            cat load_lpr.2 >> /usr/com/sys/loadlist
            cp /usr/ava/usr.com.sys/ddf.2 /usr/com/sys/ddf
            echo "/dev/tty55" >> /usr/customer/sys/prt_cnfg
            break;
            ;;
        N | n | no | NO)
            cp /usr/ava/usr.com.sys/ddf.1 /usr/com/sys/ddf
            break
            ;;
        *)
            echo "Invalid choice-Please try again"
            echo "PROMPT: Invalid choice-Please try again" >> $file1
            continue
    esac
done
```

Module Name is config_ttys

```
file1=`cat /usr/ava/install/.quest_file`
cp /usr/ava/etc/ttys /etc
while :
do
```

```
echo -n "Do you wish to reconfigure a TTY (Y/N)? "
echo "QUESTION: Do you wish to reconfigure a TTY?" >> $file1
read choice
echo "RESPONSE: $choice" >> $file1
case $choice in
 N | n | no | NO)
   break
   ;;
 Y | y | yes | YES)
   while :
   do
     echo -n "Enter TTY Number (0-39)? "
     echo "QUESTION: Enter TTY Number (0-39)?" >> $file1
     read choice
     echo "RESPONSE: $choice" >> $file1
     if [ $choice -ge 0 -a $choice -le 39 ]
     then
      ttynum=$choice
      line_num=`expr $ttynum + 2`
      while :
      do
       echo -n "Do you wish to change the Baud Rate (Y/N)? "
       echo "QUESTION: Do you wish to change the Baud Rate?" >> $file1
       read choice
       echo "RESPONSE: $choice" >> $file1
       case $choice in
        N | n | no | NO)
          break
          ;;
        Y | y | yes | YES)
          echo -n "Enter Baud Rate : "
          echo "QUESTION: Enter Baud Rate : " >> $file1
          read choice
          echo "RESPONSE: $choice" >> $file1
          was=`pwd`
          cd /tmp
          cp /etc/ttys .
          echo "${line_num}s/9600/$choice/" > edcmd
          sed -f edcmd ttys > ttys.new
          cp ttys.new /etc/ttys
          cd $was
          break
          ;;
        *)
          echo "Invalid choice-Please try again"
          echo "PROMPT: Invalid choice-Please try again" >> $file1
          continue
       esac
      done
      while :
      do
        echo -n "Is the device a Line Printer (Y/N)? "
        echo "QUESTION: Is the device a Line Printer?" >> $file1
   read choice
   echo "RESPONSE: $choice" >> $file1
   case $choice in
    N | n | no | NO)
      break
      ;;
    Y | y | yes | YES)
      was=`pwd`
      cd /tmp
      cp /etc/ttys .
      echo "${line_num}s/on modem secure/off/" > edcmd
```

```
        sed -f edcmd ttys > ttys.new
        cp ttys.new /etc/ttys
        cd $was
        break
        ;;
      *)
        echo "Invalid choice-Please try again"
        echo "PROMPT: Invalid choice-Please try again" >> $file1
        continue
     esac
    done
   while :
   do
     echo -n "Does the device provide Carrier Detect (Y/N)? "
     echo "QUESTION: Does the device provide Carrier Detect?" >> $file1
     read choice
     echo "RESPONSE: $choice" >> $file1
     case $choice in
      N | n | no | NO)
        was=`pwd`
        cd /tmp
        cp /etc/ttys .
        echo "${line_num}s/modem/nomodem/" > edcmd
        sed -f edcmd ttys > ttys.new
        cp ttys.new /etc/ttys
        cd $was
        break
        ;;
      Y | y | yes | YES)
        break
        ;;
      *)
        echo "Invalid choice-Please try again"
        echo "PROMPT: Invalid choice-Please try again" >> $file1
        continue
     esac
    done
    break
   else
    echo "Invalid choice-Please try again"
    echo "PROMPT: Invalid choice-Please try again" >> $file1
    continue
   fi
  done
  ;;
 *)
  echo "Invalid choice-Please try again"
  echo "PROMPT: Invalid choice-Please try again" >> $file2
  continue
 esac
done Module Name is config_ws_3 file1=`cat /usr/ava/install/.quest_file`
rm -f /dev/gsd/dcu*
was=`pwd`
while :
do
    cd /usr/ava/usr.com.sys/loadlist
    echo -n "Install How Many 2100 Workstations (0-8)? "
    echo "QUESTION: Install How Many 2100 Workstations (0-8)? " >> $file1
    read choice
    echo "RESPONSE: $choice " >> $file1
```

```
        if [ $choice -eq 0 ]
        then
            echo "0" > /usr/ava/install/.ws_number
            cat load_ws.0 >> /usr/com/sys/loadlist
            break
        elif [ $choice -ge 1 -a $choice -le 8 ]
        then
            echo "${choice}" > /usr/ava/install/.ws_number
            cat load_ws.${choice} >> /usr/com/sys/loadlist
            i=1
            while [ "$i" -le $choice ]
            do
                touch /usr/gsd/sys/logical/cws${i}x1
                touch /usr/gsd/sys/logical/cws${i}x2
                touch /usr/gsd/sys/logical/cws${i}x3
                i=`expr $i + 1`
            done
            /usr/ava/install/chmod 777 /usr/gsd/sys/logical/*
            break
        else
            echo "Invalid choice-Please try again"
            echo "PROMPT: Invalid choice-Please try again" >> $file1
            continue
        fi
done
cd $was Module Name is copy_cfile cd $1
if [ "$2" -le 9 ]
then
    cp office0$2 /usr/mla/stdylb/cfile
else
    cp office$2 /usr/mla/stdylb/cfile
fi Module Name is copy_mla_cmds was=`pwd`
for i in `cat /usr/ava/install/.site_names.old`
do
    rm -f /usr/mla/cmds/$i
done
cd /usr/ava/usr.mla.cmds
cp alarm-summary /usr/mla/cmds
cp msg-summary /usr/mla/cmds
cp offices /usr/mla/cmds
cp search /usr/mla/cmds
cp pm-report /usr/mla/cmds
cp time /usr/mla/cmds
cp link-report /usr/mla/cmds
j=1
while [ "$j" -le 9 -a "$j" -le $1 ]
do
    cp office0$j /usr/mla/cmds
    j=`expr $j + 1`
done
while [ "$j" -le $1 ]
do
    cp office$j /usr/mla/cmds
    j=`expr $j + 1`
done
cd /usr/mla/cmds
names=`cat /usr/ava/install/.rename_sites`
```

```
if [ "$names" -eq 1 ]
then
    j=1
    while read site_name
    do
        echo $site_name > x79.tmp
        tr a-z A-Z < x79.tmp > x791.tmp
        capname=`cat x791.tmp`
        rm x79.tmp x791.tmp
        if [ "$j" -le 9 ]
        then
            echo "s/OFFICE0$j/$capname/g" > /tmp/ed100
            echo "s/office0$j/$site_name/g" >> /tmp/ed100
            sed -f /tmp/ed100 office0$j > $site_name
            rm office0$j
        else
            echo "s/OFFICE$j/$capname/g" > /tmp/ed100
            echo "s/office$j/$site_name/g" >> /tmp/ed100
            sed -f /tmp/ed100 office$j > $site_name
            rm office$j
        fi
        j=`expr $j + 1`
    done < /usr/ava/install/.site_names
    rm -f /tmp/ed100
fi
cd $was Module Name is copy_query was=`pwd`
cd /usr/ava/usr.gsd.sys.query
rm -f /usr/gsd/sys/query/*
cp main_menu /usr/gsd/sys/query
cp main_queue /usr/gsd/sys/query
cp monitor /usr/gsd/sys/query
j=1
while [ "$j" -le 9 -a "$j" -le $1 ]
do
    cp monitor_0$j /usr/gsd/sys/query
    cp queue_0$j /usr/gsd/sys/query
    j=`expr $j + 1`
done
while [ "$j" -le $1 ]
do
    cp monitor_$j /usr/gsd/sys/query
    cp queue_$j /usr/gsd/sys/query
    j=`expr $j + 1`
done
cd /usr/gsd/sys/query
names=`cat /usr/ava/install/.rename_sites`
if [ "$names" -eq 1 ]
then
    j=1
    while read site_name
    do
        if [ "$j" -le 9 ]
        then
            /usr/ava/install/edit_query $site_name 0$j
        else
            /usr/ava/install/edit_query $site_name $j
        fi
        j=`expr $j + 1`
    done < /usr/ava/install/.site_names
fi
cd $was
```

Module Name is create_links

```
rm -f /usr/bin/utilities
ln -s /usr/ava/root_utilities/utilities /usr/bin/utilities
```

Module Name is delete_sites

```
if [ -f /usr/ava/install/.site_names ]
then
    cd /usr/ava/install
    /usr/mnsc/mla/obj/acproc > temp << EOF
list
RIPU1
ALL
N EOF
    for i in `cat .site_names`
    do
        grep "$i" temp >> temp1
    done
    sed -f edcmdl.hb temp1 > tmp
    while read aa site hour min bb cc dd ee ff gg hh ii jj kk ll mm
    do
        /usr/mnsc/mla/obj/acproc > /dev/null << EOF
deactivate
$site
ripul EOF
        /usr/mnsc/mla/obj/acproc > /dev/null << EOF
remove
$site
ripul EOF
    done < tmp rm temp temp1 tmp
fi
/usr/mnsc/mla/obj/acproc > /dev/null << EOF
deactivate
codex
ripul EOF
/usr/mnsc/mla/obj/acproc > /dev/null << EOF
remove
codex
ripul

EOF
```

Module Name is edit_cfile

```
cd /usr/mla/stdylb/cfile
```

```
names=`cat /usr/ava/install/.rename_sites`
if [ "$names" -eq 1 ]
then
    j=1
    while read site_name
    do
        if [ "$j" -le 9 ]
        then
            if [ -f office0$j ]
            then
                mv office0$j $site_name
            fi
        else
            if [ -f office$j ]
            then
                mv office$j $site_name
            fi
        fi
/usr/mnsc/mla/obj/qpproc > /dev/null << EOF
edit
$site_name $site_name EOF
        j=`expr $j + 1`
    done < /usr/ava/install/.site_names
fi Module Name is edit_query file1="monitor_$2"
file2="queue_$2"
echo "s/office$2/${1}/g" > edcmd
cp $file1 tmp.file
sed -f edcmd tmp.file > $file1
cp $file2 tmp.file
sed -f edcmd tmp.file > $file2
rm edcmd
rm tmp.file Module Name is expand_rdx i=`cat /usr/ava/questions/number`
file1="/usr/ava/questions/session.$i"
echo "$file1" > /usr/ava/install/.quest_file
i=`expr $i + 1`
echo "$i" > /usr/ava/questions/number
echo "." > $file1
echo "Expanding SX(s) in the System" >> $file1
echo `date` >> $file1
echo " " >> $file1
oldrdx=`cat /usr/ava/install/.rdx_number`
rdxstart=`expr "$oldrdx" + 1`
echo "
The System will automatically reboot during this process.
"
    echo "PROMPT: The System will automatically reboot during this process." >> $file1
```

```
echo -n "Do you wish to proceed (Y/N) ? "
echo "QUESTION: Do you wish to proceed (Y/N) ? " >> $file1
read choice
echo "RESPONSE: $choice " >> $file1
case $choice in
    Y | y | yes | YES)
        break;
        ;;
    *)
        echo "Expand SX Aborted..."
        echo "PROMPT: Expand SX Aborted..." >> $file1
        exit 1
esac echo " "
echo "The 2100 Workstations cannot be displaying graphics during this
process. All screens being displayed on GSD Display Windows will now be
canceled before proceeding.
"
/usr/ava/install/cancel_all_screens while :
do
    echo -n "Expand to How Many SXs ($rdxstart-39)? "
    echo "QUESTION: Expand to How Many SXs ($rdxstart-39)? " >> $file1
    read choice
    echo "RESPONSE: $choice " >> $file1
    if [ $choice -ge $rdxstart -a $choice -le 39 ]
    then
        rdxnum=$choice
        echo "$rdxnum" > /usr/ava/install/.rdx_number
        /usr/ava/install/query_nodes $rdxstart $rdxnum 1 $file1
        /usr/ava/screens/make_screens $rdxstart
        /usr/ava/screens/update_screens
        j=1
        while read site_name
        do
            if [ "$j" -ge "$rdxstart" ]
            then
                if [ "$j" -le 24 ]
                then
                    /usr/ava/install/hialloc2.job $site_name
                else
                    /usr/ava/install/hialloc1.job $site_name
                fi
            fi
            j=`expr $j + 1`
        done < /usr/ava/install/.site_names
        /usr/ava/install/copy_mla_cmds $rdxnum
        /usr/ava/install/copy_query $rdxnum
        /usr/ava/install/config_FEPS $rdxnum
        /usr/ava/install/fix_grps
        /usr/ava/install/store_screens
        /usr/ava/install/activate_all_screens
        echo " "
        echo "System is now going to reboot automatically."
        echo " "
        sleep 10
        /bin/reboot
        break
    else
        echo "Invalid choice-Please try again"
        echo "PROMPT: Invalid choice-Please try again" >> $file1
        continue
    fi
done
```

Module Name is finish_assemble

/usr/ava/install/gsdass
/usr/ava/install/fix_grps
/usr/ava/install/store_screens
rm -f /.assemble_graphics Module Name is fix_grps ws_number=`cat /usr/ava/install/.ws_number`
if [ "$ws_number" -ne 0 ]
then
    /usr/ava/install/fix_screen_grps
fi
cd /usr/mla/cmds
/usr/ava/install/chmod 777 *
/usr/ava/install/chgrp 192 *
cd /usr/com/sys/rpts
/usr/ava/install/chmod 777 *
/usr/ava/install/chgrp 192 *
cd /usr/rw01/com/sys/makescreen
find . -exec /usr/ava/install/chgrp 189 {} \;
/usr/ava/install/chgrp 176 dxc2000 acdmain
g_flag=`cat /usr/ava/install/.graphics`
if [ "$g_flag" -eq 1 ]
then
    /usr/ava/install/chgrp 177 graphics
fi
/usr/ava/install/chgrp 180 alarms handle monitor
/usr/ava/install/chgrp -f 181 admin patch utility
/usr/ava/install/chgrp 182 super
/usr/ava/install/chgrp 183 user
/usr/ava/install/chgrp 185 hardware
/usr/ava/install/chgrp 186 display
/usr/ava/install/chgrp 187 network
/usr/ava/install/chgrp 188 report
r_flag=`cat /usr/ava/install/.reports`
if [ "$r_flag" -eq 1 ]
then
    /usr/ava/install/chgrp 188 history-report
fi
/usr/ava/install/chmod 4755 /bin/reboot /bin/halt
/usr/ava/install/chmod 666 /usr/com/sys/ddf
/usr/ava/install/chgrp 176 /usr/gsd/sys/query/main_menu
/usr/ava/install/chgrp 180 /usr/gsd/sys/query/monitor
/usr/ava/install/chgrp 180 /usr/gsd/sys/query/main_queue
ls /usr/gsd/sys/query > files.tmp
egrep "_01" files.tmp > rfiles.tmp
for i in `cat rfiles.tmp`
do
    /usr/ava/install/chgrp 131 /usr/gsd/sys/query/$i
done
egrep "_02" files.tmp > rfiles.tmp
for i in `cat rfiles.tmp`
do
    /usr/ava/install/chgrp 132 /usr/gsd/sys/query/$i
done
egrep "_03" files.tmp > rfiles.tmp
for i in `cat rfiles.tmp`
do
    /usr/ava/install/chgrp 133 /usr/gsd/sys/query/$i
done
egrep "_04" files.tmp > rfiles.tmp
for i in `cat rfiles.tmp`
do
    /usr/ava/install/chgrp 134 /usr/gsd/sys/query/$i
```

```
done
egrep "_05" files.tmp > rfiles.tmp
for i in `cat rfiles.tmp`
do
    /usr/ava/install/chgrp 135 /usr/gsd/sys/query/$i
done
egrep "_06" files.tmp > rfiles.tmp
for i in `cat rfiles.tmp`
do
    /usr/ava/install/chgrp 136 /usr/gsd/sys/query/$i
done
egrep "_07" files.tmp > rfiles.tmp
for i in `cat rfiles.tmp`
do
    /usr/ava/install/chgrp 137 /usr/gsd/sys/query/$i
done
egrep "_08" files.tmp > rfiles.tmp
for i in `cat rfiles.tmp`
do
    /usr/ava/install/chgrp 138 /usr/gsd/sys/query/$i
done
egrep "_09" files.tmp > rfiles.tmp
for i in `cat rfiles.tmp`
do
    /usr/ava/install/chgrp 139 /usr/gsd/sys/query/$i
done
egrep "_10" files.tmp > rfiles.tmp
for i in `cat rfiles.tmp`
do
    /usr/ava/install/chgrp 140 /usr/gsd/sys/query/$i
done
egrep "_11" files.tmp > rfiles.tmp
for i in `cat rfiles.tmp`
do
    /usr/ava/install/chgrp 141 /usr/gsd/sys/query/$i
done
egrep "_12" files.tmp > rfiles.tmp
for i in `cat rfiles.tmp`
do
    /usr/ava/install/chgrp 142 /usr/gsd/sys/query/$i
done
egrep "_13" files.tmp > rfiles.tmp
for i in `cat rfiles.tmp`
do
    /usr/ava/install/chgrp 143 /usr/gsd/sys/query/$i
done
egrep "_14" files.tmp > rfiles.tmp
for i in `cat rfiles.tmp`
do
    /usr/ava/install/chgrp 144 /usr/gsd/sys/query/$i
done
egrep "_15" files.tmp > rfiles.tmp
for i in `cat rfiles.tmp`
do
    /usr/ava/install/chgrp 145 /usr/gsd/sys/query/$i
done
egrep "_16" files.tmp > rfiles.tmp
for i in `cat rfiles.tmp`
do
    /usr/ava/install/chgrp 146 /usr/gsd/sys/query/$i
done
egrep "_17" files.tmp > rfiles.tmp
for i in `cat rfiles.tmp`
do
    /usr/ava/install/chgrp 147 /usr/gsd/sys/query/$i
```

```
done
egrep "_18" files.tmp > rfiles.tmp
for i in `cat rfiles.tmp`
do
    /usr/ava/install/chgrp 148 /usr/gsd/sys/query/$i
done
egrep "_19" files.tmp > rfiles.tmp
for i in `cat rfiles.tmp`
do
    /usr/ava/install/chgrp 149 /usr/gsd/sys/query/$i
done
egrep "_20" files.tmp > rfiles.tmp
for i in `cat rfiles.tmp`
do
    /usr/ava/install/chgrp 150 /usr/gsd/sys/query/$i
done
egrep "_21" files.tmp > rfiles.tmp
for i in `cat rfiles.tmp`
do
    /usr/ava/install/chgrp 151 /usr/gsd/sys/query/$i
done
egrep "_22" files.tmp > rfiles.tmp
for i in `cat rfiles.tmp`
do
    /usr/ava/install/chgrp 152 /usr/gsd/sys/query/$i
done
egrep "_23" files.tmp > rfiles.tmp
for i in `cat rfiles.tmp`
do
    /usr/ava/install/chgrp 153 /usr/gsd/sys/query/$i
done
egrep "_24" files.tmp > rfiles.tmp
for i in `cat rfiles.tmp`
do
    /usr/ava/install/chgrp 154 /usr/gsd/sys/query/$i
done
egrep "_25" files.tmp > rfiles.tmp
for i in `cat rfiles.tmp`
do
    /usr/ava/install/chgrp 155 /usr/gsd/sys/query/$i
done
egrep "_26" files.tmp > rfiles.tmp
for i in `cat rfiles.tmp`
do
    /usr/ava/install/chgrp 156 /usr/gsd/sys/query/$i
done
egrep "_27" files.tmp > rfiles.tmp
for i in `cat rfiles.tmp`
do
    /usr/ava/install/chgrp 157 /usr/gsd/sys/query/$i
done
egrep "_28" files.tmp > rfiles.tmp
for i in `cat rfiles.tmp`
do
    /usr/ava/install/chgrp 158 /usr/gsd/sys/query/$i
done
egrep "_29" files.tmp > rfiles.tmp
for i in `cat rfiles.tmp`
do
    /usr/ava/install/chgrp 159 /usr/gsd/sys/query/$i
done
egrep "_30" files.tmp > rfiles.tmp
for i in `cat rfiles.tmp`
do
    /usr/ava/install/chgrp 160 /usr/gsd/sys/query/$i
```

```
done
egrep "_31" files.tmp > rfiles.tmp
for i in `cat rfiles.tmp`
do
    /usr/ava/install/chgrp 161 /usr/gsd/sys/query/$i
done
egrep "_32" files.tmp > rfiles.tmp
for i in `cat rfiles.tmp`
do
    /usr/ava/install/chgrp 162 /usr/gsd/sys/query/$i
done
egrep "_33" files.tmp > rfiles.tmp
for i in `cat rfiles.tmp`
do
    /usr/ava/install/chgrp 163 /usr/gsd/sys/query/$i
done
egrep "_34" files.tmp > rfiles.tmp
for i in `cat rfiles.tmp`
do
    /usr/ava/install/chgrp 164 /usr/gsd/sys/query/$i
done
egrep "_35" files.tmp > rfiles.tmp
for i in `cat rfiles.tmp`
do
    /usr/ava/install/chgrp 165 /usr/gsd/sys/query/$i
done
egrep "_36" files.tmp > rfiles.tmp
for i in `cat rfiles.tmp`
do
    /usr/ava/install/chgrp 166 /usr/gsd/sys/query/$i
done
egrep "_37" files.tmp > rfiles.tmp
for i in `cat rfiles.tmp`
do
    /usr/ava/install/chgrp 167 /usr/gsd/sys/query/$i
done
egrep "_38" files.tmp > rfiles.tmp
for i in `cat rfiles.tmp`
do
    /usr/ava/install/chgrp 168 /usr/gsd/sys/query/$i
done
egrep "_39" files.tmp > rfiles.tmp
for i in `cat rfiles.tmp`
do
    /usr/ava/install/chgrp 169 /usr/gsd/sys/query/$i
done
rm *.tmp Module Name is fix_hw_grps cd /usr/rw01/com/sys/hwpages
find . -type f -exec /usr/ava/install/chgrp 176 {} \;
find . -type f -exec /usr/ava/install/chmod 444 {} \;

Module Name is fix_screen_grps

/usr/ava/install/chgrp 130 /usr/gsd/screen/text/alarm.scr
/usr/ava/install/chgrp 130 /usr/gsd/screen/assemble/alarm
/usr/ava/install/chgrp 130 /usr/gsd/screen/text/alarmh.scr
/usr/ava/install/chgrp 130 /usr/gsd/screen/assemble/alarmh
ls /usr/ava/install/scr_by_site > modlist
grp=130
while read filename
do
    for i in `cat /usr/ava/install/scr_by_site/$filename`
    do
```

```
            base=`basename $i .scr`
            /usr/ava/install/chgrp $grp /usr/gsd/screen/text/$base.scr
            /usr/ava/install/chgrp $grp /usr/gsd/screen/assemble/$base
        done
        grp=`expr $grp + 1`
done < modlist
rm modlist
```

Module Name is fix_screen_scrs

```
/usr/ava/install/chgrp 130 /usr/gsd/screen/text/alarm.scr
/usr/ava/install/chgrp 130 /usr/gsd/screen/text/alarmh.scr
ls /usr/ava/install/scr_by_site > modlist
grp=130
while read filename
do
    for i in `cat /usr/ava/install/scr_by_site/$filename`
    do
        /usr/ava/install/chgrp $grp /usr/gsd/screen/text/$i
    done
    grp=`expr $grp + 1`
done < modlist
rm modlist
```

Module Name is grow_rdx

```
i=`cat /usr/ava/questions/number`
file1="/usr/ava/questions/session.$i"
echo "$file1" > /usr/ava/install/.quest_file
i=`expr $i + 1`
echo "$i" > /usr/ava/questions/number
echo " " > $file1
echo "Resize One SX in System" >> $file1
echo `date` >> $file1
echo " " >> $file1 echo " "
echo "The 2100 Workstations cannot be displaying graphics during this
process.  All screens being displayed on GSD Display Windows will now be
canceled before proceeding.
"
/usr/ava/install/cancel_all_screens rdxmax=`cat /usr/ava/install/.rdx_number`
while :
do
    echo -n "Change which SX (1-$rdxmax)? "
    echo "QUESTION: Change which SX (1-$rdxmax)? " >> $file1
    read choice
    echo "RESPONSE: $choice " >> $file1
    if [ $choice -ge 1 -a $choice -le $rdxmax ]
    then
        rdxnum=$choice
        for i in `cat /usr/ava/install/scr_by_site/site.${rdxnum}`
        do
            rm -f /usr/gsd/screen/text/$i
            base=`basename $i .scr`
            rm -f /usr/gsd/screen/assemble/${base}
        done
        rm -f /usr/ava/install/scr_by_site/site.${rdxnum}
        /usr/ava/install/grow_rdx_ptl $rdxnum
        /usr/ava/install/fix_grps
        /usr/ava/install/store_screens
        /usr/ava/install/activate_all_screens
        echo "
```

This will complete the Grow Process.
"
```
      break
   else
      echo "Invalid choice-Please try again"
      echo "PROMPT: Invalid choice-Please try again" >> $file1
      continue
   fi
done
```

Module Name is grow_rdx_pt1

```
file2=`cat /usr/ava/install/.quest_file`
rdx=$1
rm -f /usr/gsd/sys/sr_definition/SR/MLA/summary
cat /usr/ava/super_registers/network >> /usr/gsd/sys/sr_definition/SR/MLA/summary
mv /usr/ava/screens/rdx_cnfg.parms /tmp/rdx_cnfg.parms
while read node type bays growth name
do
   if [ "$node" -eq "$rdx" ]
   then
      echo $type > /tmp/.rdx_type
      echo $growth > /tmp/.rdx_growth
      echo $name > /tmp/.rdx_name
   fi
done < /tmp/rdx_cnfg.parms type=`cat /tmp/.rdx_type`
growth=`cat /tmp/.rdx_growth`
name=`cat /tmp/.rdx_name`
if [ $type -eq 3 ]
then
   if [ "$growth" -eq "r" ]
   then
      echo "Configure Node $name a 1633 SX Right Growth Cross-Connect "
   else
      echo "Configure Node $name a 1633 SX Left Growth Cross-Connect "
   fi
   echo "PROMPT: Configure Node $name : " >> $file2
   while :
   do
      echo -n "Enter # Ports (64,128,256,512,1024,2048)? "
      echo "QUESTION: Enter # Ports (64,128,256,512,1024,2048)?" >> $file2
      read choice
      echo "RESPONSE: $choice" >> $file2
      if [ $choice -eq 64 ]
      then
         while :
         do
            echo -n "Enter # Bays (2,3)? "
            echo "QUESTION: Enter # Bays (2,3)?" >> $file2
            read choice
            echo "RESPONSE: $choice" >> $file2
            if [ $choice -eq 2 ]
            then
               new_bays=0
               break
            elif [ $choice -eq 3 ]
            then
               new_bays=1
               break
            else
               echo "Invalid choice-Please try again"
               echo "PROMPT: Invalid choice-Please try again" >> $file2
               continue
            fi
         done
         break
      elif [ $choice -eq 128 ]
```

```
then
   while :
   do
      echo -n "Enter # Bays (2,3)? "
      echo "QUESTION: Enter # Bays (2,3)?" >> $file2
      read choice
      echo "RESPONSE: $choice" >> $file2
      if [ $choice -eq 2 ]
      then
         new_bays=2
         break
      elif [ $choice -eq 3 ]
      then
         new_bays=3
         break
      else
         echo "Invalid choice-Please try again"
         echo "PROMPT: Invalid choice-Please try again" >> $file2
         continue
      fi
   done
   break
elif [ $choice -eq 256 ]
then
   while :
   do
      echo -n "Does this system contain an APU shelf (Y/N)? "
      echo "QUESTION: Does this system contain an APU shelf (Y/N)?" >> $file
      read choice
      echo "RESPONSE: $choice" >> $file2
      case $choice in
         N | n | no | NO)
            new_bays=5
            break
            ;;
         Y | y | yes | YES)
            new_bays=4
            break
            ;;
         *)
            echo "Invalid choice-Please try again"
            echo "PROMPT: Invalid choice-Please try again" >> $file2
            continue
      esac
   done
   break
elif [ $choice -eq 512 ]
then
   while :
   do
      echo -n "Does this system contain an APU shelf (Y/N)? "
      echo "QUESTION: Does this system contain an APU shelf (Y/N)?" >> $file
      read choice
      echo "RESPONSE: $choice" >> $file2
      case $choice in
         N | n | no | NO)
            new_bays=8
            break
            ;;
         Y | y | yes | YES)
            new_bays=7
            break
            ;;
         *)
            echo "Invalid choice-Please try again"
            echo "PROMPT: Invalid choice-Please try again" >> $file2
            continue
      esac
```

```
            done
            break
        elif [ $choice -eq 1024 ]
        then
            new_bays=13
            break
        elif [ $choice -eq 2048 ]
        then
            new_bays=25
            break
        else
            echo "Invalid choice-Please try again"
            echo "PROMPT: Invalid choice-Please try again" >> $file2
            continue
        fi
    done
    cd /usr/ava/screens/rdx33
    make_screens $rdx $new_bays $growth $name
    make_SR $rdx $new_bays $name
fi
if [ $type -eq 1 ]
then
    if [ "$growth" -eq "r" ]
    then
        echo "Configure Node $name a 1631 SX Right Growth Cross-Connect "
    else
        echo "Configure Node $name a 1631 SX Left Growth Cross-Connect "
    fi
    while :
    do
        echo -n "Enter # Ports (8,16,32,64,128,256)? "
        echo "QUESTION: Enter # Ports (8,16,32,64,128,256)?" >> $file2
        read choice
        echo "RESPONSE: $choice" >> $file2
        if [ $choice -eq 8 ]
        then
            new_bays=0
            break
        elif [ $choice -eq 16 ]
        then
            new_bays=1
            break
        elif [ $choice -eq 32 ]
        then
            new_bays=2
            break
        elif [ $choice -eq 64 ]
        then
            new_bays=4
            break
        elif [ $choice -eq 128 ]
        then
        new_bays=6
        break
    elif [ $choice -eq 256 ]
        then
            new_bays=13
            break
        else
            echo "Invalid choice-Please try again"
            echo "PROMPT: Invalid choice-Please try again" >> $file2
            continue
        fi
done
rm -f /usr/ava/screens/rdx31/cnfg/.QUAD${rdx}x*
```

```
        /usr/ava/install/config_31_QUADS $rdx $new_bays $file2
        cd /usr/ava/screens/rdx31
        make_screens $rdx $new_bays $growth $name
        make_SR $rdx $new_bays $name
fi
if [ $type -eq 0 ]
then
    if [ "$growth" -eq "r" ]
    then
        echo "Configure Node $name a 1630 SX Right Growth Cross-Connect "
    else
        echo "Configure Node $name a 1630 SX Left Growth Cross-Connect "
    fi
    while :
    do
        echo -n "Enter # Ports (8,16,32)? "
        echo "QUESTION: Enter # Ports (8,16,32)?" >> $file2
        read choice
        echo "RESPONSE: $choice" >> $file2
        if [ $choice -eq 8 ]
        then
            new_bays=0
            break
        elif [ $choice -eq 16 ]
        then
            new_bays=1
            break
        elif [ $choice -eq 32 ]
        then
            new_bays=2
            break
        elif [ $choice -eq 64 ]
        then
            new_bays=4
            break
        else
            echo "Invalid choice-Please try again"
            echo "PROMPT: Invalid choice-Please try again" >> $file2
            continue
        fi
    done
    rm -f /usr/ava/screens/rdx310/cnfg/.QUAD${rdx}x*
    /usr/ava/install/config_310_QUADS $rdx $new_bays $file2
    cd /usr/ava/screens/rdx310
    make_screens $rdx $new_bays $growth $name
    make_SR $rdx $new_bays $name
fi
cd /usr/ava/screens
while read node type bays growth name
do
    if [ "$node" -eq "$rdx" ]
    then
        echo "$node $type $new_bays $growth $name" >> rdx_cnfg.parms
    else
        if [ "$node" -ge 1 -a "$node" -le 9 ]
        then
            site_name="SS0${node}"
        else
            site_name="SS${node}"
        fi
        if [ $type -eq 3 ]
        then
            if [ $bays -eq 0 ]
            then
                /usr/ava/super_registers/33/make_64 $site_name $name $node
```

```
        elif [ $bays -eq 1 ]
        then
            /usr/ava/super_registers/33/make_64.3 $site_name $name $node
        elif [ $bays -eq 2 ]
        then
            /usr/ava/super_registers/33/make_128 $site_name $name $node
        elif [ $bays -eq 3 ]
        then
            /usr/ava/super_registers/33/make_128.3 $site_name $name $node
        elif [ $bays -eq 4 ]
        then
            /usr/ava/super_registers/33/make_256 $site_name $name $node
        elif [ $bays -eq 5 ]
        then
            /usr/ava/super_registers/33/make_256.s $site_name $name $node
        elif [ $bays -eq 7 ]
        then
            /usr/ava/super_registers/33/make_512 $site_name $name $node
        elif [ $bays -eq 8 ]
        then
            /usr/ava/super_registers/33/make_512.s $site_name $name $node
        elif [ $bays -eq 13 ]
        then
            /usr/ava/super_registers/33/make_1024 $site_name $name $node
        else
            /usr/ava/super_registers/33/make_2048 $site_name $name $node
        fi
fi
if [ $type -eq 1 ]
then
    if [ $bays -eq 0 ]
    then
        /usr/ava/super_registers/31/make_8 $site_name $name $node
    elif [ $bays -eq 1 ]
    then
        /usr/ava/super_registers/31/make_16 $site_name $name $node
    elif [ $bays -eq 2 ]
    then
        /usr/ava/super_registers/31/make_32 $site_name $name $node
    elif [ $bays -eq 4 ]
    then
        /usr/ava/super_registers/31/make_64 $site_name $name $node
    elif [ $bays -eq 6 ]
    then
        /usr/ava/super_registers/31/make_128 $site_name $name $node
    elif [ $bays -eq 13 ]
    then
        /usr/ava/super_registers/31/make_256 $site_name $name $node
    elif [ $bays -eq 19 ]
    then
        /usr/ava/super_registers/31/make_512 $site_name $name $node
    else
        /usr/ava/super_registers/31/make_1024 $site_name $name $node
    fi
fi
if [ $type -eq 0 ]
then
    if [ $bays -eq 0 ]
    then
        /usr/ava/super_registers/310/make_8 $site_name $name $node
    elif [ $bays -eq 1 ]
    then
        /usr/ava/super_registers/310/make_16 $site_name $name $node
    elif [ $bays -eq 2 ]
    then
```

```
                /usr/ava/super_registers/310/make_32 $site_name $name $node
            elif [ $bays -eq 4 ]
            then
                /usr/ava/super_registers/310/make_64 $site_name $name $node
            elif [ $bays -eq 6 ]
            then
                /usr/ava/super_registers/310/make_128 $site_name $name $node
            else
                /usr/ava/super_registers/310/make_256 $site_name $name $node
            fi
        fi
        echo "$node $type $bays $growth $name" >> rdx_cnfg.parms
    fi
done < /tmp/rdx_cnfg.parms
rm /tmp/rdx_cnfg.parms
update_screens Module Name is gsd/bs echo "
Creating Super Register files...
"
/usr/mnsc/gsd/obj/deproc > /dev/null << EOF
binary
24hr

Y

EOF
echo "
Assembling Screens...
"
echo assemble >deprocinp
echo all >> deprocinp
echo >> deprocinp
echo >> deprocinp
/usr/mnsc/gsd/obj/deproc > /dev/null < deprocinp
/usr/mnsc/gsd/obj/deproc > /dev/null <<  EOF
activate
24hr EOF
rm deprocinp Module Name is hialloc.mla for i in /usr/mla/history/*
do
    rm -rf $i
done
for i in /usr1/mla/history/*
do
    rm -rf $i
done
rm -f /usr/mla/histdrives/*
j=1
while read site_name
do
    if [ "$j" -le 24 ]
    then
        /usr/ava/install/hialloc2.job $site_name
```

```
    else
        /usr/ava/install/hialloc1.job $site_name
    fi
    j=`expr $j + 1`
    sleep 30
done < /usr/ava/install/.site_names
/usr/mnsc/mla/obj/hiproc > /dev/null << EOF
all
everyone
2
3000
100
1

EOF
/usr/mnsc/mla/obj/hiproc > /dev/null << EOF
all
default
2
200
20
7

EOF
/usr/mnsc/mla/obj/hiproc > /dev/null << EOF
all
h-mnsc
2
200
20
7

EOF
/usr/mnsc/mla/obj/hiproc > /dev/null << EOF
all
codex
2
1000
100
7

EOF
/usr/mnsc/mla/obj/hiproc > /dev/null << EOF
all
nomatch
1
200
20
7

EOF
sleep 60
```

Module Name is hialloc1.job

```
/usr/mnsc/mla/obj/hiproc > /dev/null << EOF
all
$1
1
500
100
32

EOF
```

Module Name is hialloc2.job

```
/usr/mnsc/mla/obj/hiproc > /dev/null << EOF
all
$1
2
500
100
32

EOF
```

Module Name is install

```
i=`cat /usr/ava/questions/number`
file1="/usr/ava/questions/session.$i"
echo "$file1" > /usr/ava/install/.quest_file
i=`expr $i + 1`
echo "$i" > /usr/ava/questions/number
echo " " >> $file1
echo "Installing the System" >> $file1
echo `date` >> $file1
echo " " >> $file1

/usr/ava/install/upgrade $file1
ws_number=`cat /usr/ava/install/.ws_number`
if [ "$ws_number" -ne 0 ]
then
    echo " "
    echo "The 2100 Workstations cannot be displaying graphics during this next
process.  All screens being displayed on GSD Display Windows will now be
canceled before proceeding.
"
    /usr/ava/install/cancel_all_screens /usr/ava/install/gsdass
    /usr/ava/install/fix_grps
    /usr/ava/install/store_screens
    /usr/ava/install/activate_all_screens
fi
echo "   "
echo "System is going to now reboot automatically."
/bin/reboot
```

Module Name is is tnum.c

```c
include<stdio.h>
include<string.h> main(argc, argv)
    int argc;
    char *argv[];

{
    int rdxlen;
    int i;
    static char rdx[20];
    int   done_flag;
    char  sitename[20];
    FILE  *fd, *fopen ();

if (argc == 1)
    return 1;

if (argc > 2)
        return 2;
```

```
strcpy(rdx, argv[1]);
rdxlen = strlen(rdx);
if ( ! rdxlen)
    return 3;
if ( rdxlen > 8 )
    return 3;

if (( rdx[0] >= 'a' && rdx[0] <= 'z')
||   ( rdx[0] >= 'A' && rdx[0] <= 'Z'))
{
    i = 1;
    while( rdx[i] )
    {
        if (( rdx[i] >= 'a' && rdx[i] <= 'z')
        ||   ( rdx[i] >= 'A' && rdx[i] <= 'Z')
        ||   ( rdx[i] >= '0' && rdx[i] <= '9'))
            i++;
        else
            return 6;
    }
}
else
    return 5;

fd = fopen ( "/usr/ava/install/.site_names", "r" );
done_flag = 1;
while ( done_flag )
{
    if ( fgets ( sitename, 20, fd ) != 0 )
    {
        rdxlen = strlen( sitename );
        rdxlen -= 1;
        if ( strncmp ( rdx, sitename, rdxlen ) == 0 )
        {
            close ( fd );
            return 4;
        }
    }
    else
    {
        close (fd);
        done_flag = 0;
    }
} return 0;

}
```

Module Name is logoff_all_screens

```
/usr/mnsc/gsd/obj/stproc > /dev/null << EOF
cancel
all
cws1x1

EOF
/usr/mnsc/gsd/obj/stproc > /dev/null << EOF
request
logoff
cws1x1

EOF
```

```
/usr/mnsc/gsd/obj/stproc > /dev/null << EOF
cancel
all
cws2x1

EOF
/usr/mnsc/gsd/obj/stproc > /dev/null << EOF
request
logoff
cws2x1

EOF
/usr/mnsc/gsd/obj/stproc > /dev/null << EOF
cancel
all
cws3x1

EOF
/usr/mnsc/gsd/obj/stproc > /dev/null << EOF
request
logoff
cws3x1

EOF
/usr/mnsc/gsd/obj/stproc > /dev/null << EOF
cancel
all
cws4x1

EOF
/usr/mnsc/gsd/obj/stproc > /dev/null << EOF
request
logoff
cws4x1

EOF
/usr/mnsc/gsd/obj/stproc > /dev/null << EOF
/usr/mnsc/gsd/obj/stproc > /dev/null << EOF
cancel
all
cws5x1

EOF
/usr/mnsc/gsd/obj/stproc > /dev/null << EOF
request
logoff
cws5x1

EOF
/usr/mnsc/gsd/obj/stproc > /dev/null << EOF
cancel
all
cws6x1

EOF
/usr/mnsc/gsd/obj/stproc > /dev/null << EOF
```

```
request
logoff
cws6x1

EOF
/usr/mnsc/gsd/obj/stproc > /dev/null << EOF
cancel
all
cws7x1

EOF
/usr/mnsc/gsd/obj/stproc > /dev/null << EOF
request
logoff
cws7x1

EOF
/usr/mnsc/gsd/obj/stproc > /dev/null << EOF
cancel
all
cws8x1

EOF
/usr/mnsc/gsd/obj/stproc > /dev/null << EOF
request
logoff
cws8x1

EOF
/usr/mnsc/gsd/obj/stproc > /dev/null << EOF
cancel
all
cws1x2

EOF
/usr/mnsc/gsd/obj/stproc > /dev/null << EOF
request
logoff
cws1x2

EOF
/usr/mnsc/gsd/obj/stproc > /dev/null << EOF
cancel
all
cws2x2

EOF
/usr/mnsc/gsd/obj/stproc > /dev/null << EOF
request
logoff
cws2x2

EOF
/usr/mnsc/gsd/obj/stproc > /dev/null << EOF
cancel
all
cws3x2
```

```
EOF
/usr/mnsc/gsd/obj/stproc > /dev/null << EOF
request
logoff.
cws3x2

EOF
/usr/mnsc/gsd/obj/stproc > /dev/null << EOF
cancel
all
cws4x2

EOF
/usr/mnsc/gsd/obj/stproc > /dev/null << EOF
request
logoff
cws4x2

EOF
/usr/mnsc/gsd/obj/stproc > /dev/null << EOF
/usr/mnsc/gsd/obj/stproc > /dev/null << EOF
cancel
all
cws5x2

EOF
/usr/mnsc/gsd/obj/stproc > /dev/null << EOF
request
logoff
cws5x2

EOF
/usr/mnsc/gsd/obj/stproc > /dev/null << EOF
cancel
all
cws6x2

EOF
/usr/mnsc/gsd/obj/stproc > /dev/null << EOF
request
logoff
cws6x2

EOF
/usr/mnsc/gsd/obj/stproc > /dev/null << EOF
cancel
all
cws7x2

EOF
/usr/mnsc/gsd/obj/stproc > /dev/null << EOF
request
logoff
cws7x2
```

```
EOF
/usr/mnsc/gsd/obj/stproc > /dev/null << EOF
cancel
all
cws8x2

EOF
/usr/mnsc/gsd/obj/stproc > /dev/null << EOF
request
logoff
cws8x2

EOF

Module Name is query_io_shelves while read node type bays growth name
do
    if [ $type -eq 1 ]
    then
        /usr/ava/install/config_31_QUADS $node $bays
    fi
    if [ $type -eq 0 ]
    then
        /usr/ava/install/config_310_QUADS $node $bays
    fi
done < /usr/ava/screens/rdx_cnfg.parms Module Name is query_nodes i=$1
rdxend=$2
expand=$3
file2=$4
file1="/usr/ava/screens/rdx_cnfg.parms"
if [ $expand -ne 1 ]
then
    rm -f $file1
fi
rename=`cat /usr/ava/install/.rename_sites`
cd /usr/ava/screens
while [ "$i" -le $rdxend ]
do
    echo "Configure Site $i : "
    echo "PROMPT: Configure Site $i : " >> $file2
    while :
    do
        echo -n "Enter SX Type (33,31,310)? "
        echo "QUESTION: Enter SX Type (33,31,310)?" >> $file2
        read choice
        echo "RESPONSE: $choice" >> $file2
        if [ $choice -eq 33 ]
        then
            type=3
            break
        elif [ $choice -eq 31 ]
        then
            type=1
            break
        elif [ $choice -eq 310 ]
        then
            type=0
            break
        else
            echo "Invalid choice-Please try again"
```

```
            echo "PROMPT: Invalid choice-Please try again" >> $file2
            continue
        fi
    done
if [ $type -eq 3 ]
then
    while :
    do
        echo -n "Enter # Ports (64,128,256,512,1024,2048)? "
        echo "QUESTION: Enter # Ports (64,128,256,512,1024,2048)?" >> $file2
        read choice
        echo "RESPONSE: $choice" >> $file2
        if [ $choice -eq 64 ]
        then
            while :
            do
                echo -n "Enter # Bays (2,3)? "
                echo "QUESTION: Enter # Bays (2,3)?" >> $file2
                read choice
                echo "RESPONSE: $choice" >> $file2
                if [ $choice -eq 2 ]
                then
                    bays=0
                    break
                elif [ $choice -eq 3 ]
                then
                    bays=1
                    break
                else
                    echo "Invalid choice-Please try again"
                    echo "PROMPT: Invalid choice-Please try again" >> $file2
                    continue
                fi
            done
            break
        elif [ $choice -eq 128 ]
        then
            while :
            do
                echo -n "Enter # Bays (2,3)? "
                echo "QUESTION: Enter # Bays (2,3)?" >> $file2
                read choice
                echo "RESPONSE: $choice" >> $file2
                if [ $choice -eq 2 ]
                then
                    bays=2
                    break
                elif [ $choice -eq 3 ]
                then
                    bays=3
                    break
                else
                    echo "Invalid choice-Please try again"
                    echo "PROMPT: Invalid choice-Please try again" >> $file2
                    continue
                fi
            done
            break
        elif [ $choice -eq 256 ]
        then
            while :
            do
                echo -n "Does this system contain an APU shelf (Y/N)? "
                echo "QUESTION: Does this system contain an APU shelf (Y/N)?" >> $f;
                read choice
                echo "RESPONSE: $choice" >> $file2
                case $choice in
                    N | n | no | NO)
                        bays=5
```

```
                break
            ;;
        Y | y | yes | YES)
            bays=4
            break
            ;;
        *)
            echo "Invalid choice-Please try again"
            echo "PROMPT: Invalid choice-Please try again" >> $file2
            continue
        esac
    done
    break
        elif [ $choice -eq 512 ]
        then
            while :
            do
                echo -n "Does this system contain an APU shelf (Y/N)? "
                echo "QUESTION: Does this system contain an APU shelf (Y/N)?" >$fi
                read choice
                echo "RESPONSE: $choice" >> $file2
                case $choice in
                    N | n | no | NO)
                        bays=8
                        break
                        ;;
                    Y | y | yes | YES)
                        bays=7
                        break
                        ;;
                    *)
                        echo "Invalid choice-Please try again"
                        echo "PROMPT: Invalid choice-Please try again" >> $file2
                        continue
                esac
            done
            break
        elif [ $choice -eq 1024 ]
        then
            bays=13
            break
        elif [ $choice -eq 2048 ]
        then
            bays=25
            break
        else
            echo "Invalid choice-Please try again"
            echo "PROMPT: Invalid choice-Please try again" >> $file2
            continue
        fi
    done
fi
if [ $type -eq 1 ]
then
    while :
    do
        echo -n "Enter # Ports (8,16,32,64,128,256)? "
        echo "QUESTION: Enter # Ports (8,16,32,64,128,256)?" >> $file2
        read choice
        echo "RESPONSE: $choice" >> $file2
        if [ $choice -eq 8 ]
        then
            bays=0
            break
        elif [ $choice -eq 16 ]
        then
            bays=1
            break
        elif [ $choice -eq 32 ]
```

```
            then
                bays=2
                break
            elif [ $choice -eq 64 ]
            then
                bays=3
                break
            elif [ $choice -eq 128 ]
            then
                bays=6
                break
            elif [ $choice -eq 256 ]
            then
                bays=13
                break
            else
                echo "Invalid choice-Please try again"
                echo "PROMPT: Invalid choice-Please try again" >> $file2
                continue
            fi
        done
    fi
    if [ $type -eq 0 ]
    then
        while :
        do
            echo -n "Enter # Ports (8,16,32)? "
            echo "QUESTION: Enter # Ports (8,16,32)?" >> $file2
            read choice
            echo "RESPONSE: $choice" >> $file2
            if [ $choice -eq 8 ]
            then
                bays=0
                break
            elif [ $choice -eq 16 ]
            then
                bays=1
                break
            elif [ $choice -eq 32 ]
            then
                bays=2
                break
            elif [ $choice -eq 64 ]
            then
                bays=4
                break
            else
                echo "Invalid choice-Please try again"
                echo "PROMPT: Invalid choice-Please try again" >> $file2
                continue
            fi
        done
    fi
    while :
    do
        echo -n "Enter Right or Left Growth Bay Representations (r,l)? "
        echo "QUESTION: Enter Right or Left Growth (r,l)?" >> $file2
        read choice
        echo "RESPONSE: $choice" >> $file2
        if [ "$choice" = "r" ]
        then
            cnfg="r"
            break
        elif [ "$choice" = "l" ]
```

```
            then
                cnfg="1"
                break
            else
                echo "Invalid choice-Please try again"
                echo "PROMPT: Invalid choice-Please try again" >> $file2
                continue
            fi
        done
        if [ $type -eq 1 ]
        then
            /usr/ava/install/config_31_QUADS $i $bays $file2
        fi
        if [ $type -eq 0 ]
        then
            /usr/ava/install/config_310_QUADS $i $bays $file2
        fi
        if [ $expand -eq 1 ]
        then
            if [ "$rename" -eq 1 ]
            then
                while :
                do
                    echo -n "Enter name for Site $i (1-8 Chars): "
                    echo "QUESTION: Enter name for Site $i : " >> $file2
                    read choice
                    echo "RESPONSE: $choice" >> $file2
                    /usr/ava/install/isalnum $choice
                    if [ $? -ne 0 ]
                    then
                        echo "Invalid choice-Please try again"
                        echo "PROMPT: Invalid choice-Please try again" >> $file2
                        continue
                    else
                        echo "$choice" >> /usr/ava/install/.site_names
                        name=$choice
                        break
                    fi
                done
            else
                if [ "$i" -le 9 ]
                then
                    echo "office0${i}" >> /usr/ava/install/.site_names
                    name=office0${i}
                else
                    echo "office${i}" >> /usr/ava/install/.site_names
                    name=office${i}
                fi
            fi
            echo "$i $type $bays $cnfg $name" >> $file1
        else
            echo "$i $type $bays $cnfg" >> $file1
        fi
        i=`expr $i + 1`
done Module Name is reconfig_system i=`cat /usr/ava/questions/number`
file1="/usr/ava/questions/session.$i"
echo "$file1" > /usr/ava/install/.quest_file
i=`expr $i + 1`
echo "$i" > /usr/ava/questions/number
echo "" > $file1
echo "Reconfiguring the Entire System" >> $file1
echo `date` >> $file1
```

```
echo " " >> $file1
echo "
The System will automatically reboot during this process.
"
echo "PROMPT: The System will automatically reboot during this process." >> $file1
echo -n "Do you wish to proceed (Y/N) ? "
echo "QUESTION: Do you wish to proceed (Y/N) ? " >> $file1
read choice
echo "RESPONSE: $choice " >> $file1
case $choice in
   Y | y | yes | YES)
       break;
       ;;
   *)
       echo "Reconfig System Aborted..."
       echo "PROMPT: Reconfigure System Aborted..." >> $file1
       exit 1
esac ws_number=`cat /usr/ava/install/.ws_number`
if [ "$ws_number" -ne 0 ]
then
    echo " "
    echo "The 2100 Workstations cannot be displaying graphics during this
process.  All screens being displayed on GSD Display Windows will now be
canceled before proceeding.
"
    /usr/ava/install/logoff_all_screens
fi
/usr/ava/install/delete_sites
/usr/ava/install/upgrade $file1
if [ "$ws_number" -ne 0 ]
then
    touch /.assemble_graphics
fi
echo "     "
echo "System is going to now reboot automatically."
/bin/reboot Module Name is store_screens cd /usr/gsd/screen/assemble
for i in *
do
/usr/mnsc/gsd/obj/deproc > /dev/null << EOF
store
$i EOF
done Module Name is upgrade file1=$1

/usr/mnsc/com/obj/laproc > /dev/null << EOF
level
03

EOF while :
do
    echo -n "Install How Many SXs (1-39)? "
```

```
echo "QUESTION: Install How Many SXs (1-39)? " >> $file1
read choice
echo "RESPONSE: $choice " >> $file1
if [ $choice -ge 1 -a $choice -le 39 ]
then
    rdxnum=$choice
    echo "$rdxnum" > /usr/ava/install/.rdx_number
    break
else
    echo "Invalid choice-Please try again"
    echo "PROMPT: Invalid choice-Please try again" >> $file1
    continue
fi
done
/usr/ava/install/delete_sites
while :
do
    echo " "
    echo "Answering Y to rename the sites prompt allows the use of
customer defined names for the sites being monitored.
Answering N makes the site names office01 for site 1, etc.
"
    echo -n "Do you want to rename the sites (Y/N)? "
    echo "QUESTION: Do you want to rename the sites?" >> $file1
    read choice
    echo "RESPONSE: $choice" >> $file1
    if [ -f /usr/ava/install/.site_names ]
    then
        cp /usr/ava/install/.site_names /usr/ava/install/.site_names.old
    fi
    rm -f /usr/ava/install/.site_names
    touch /usr/ava/install/.site_names
    case $choice in
        Y | y | yes | YES)
            echo "1" > /usr/ava/install/.rename_sites
            new_sites=1
            i=1
            while [ "$i" -le $rdxnum ]
            do
                echo -n "Enter name for Site $i (1-8 Chars): "
                echo "QUESTION: Enter name for Site $i : " >> $file1
                read choice
                echo "RESPONSE: $choice" >> $file1
                /usr/ava/install/isalnum $choice
                case $? in
                    0)
                        echo "$choice" >> /usr/ava/install/.site_names
                        i=`expr $i + 1`
                        ;;
                    3)
                        echo "Sitename has invalid length-Please try again"
                        echo "PROMPT: Sitename has invalid length-Please try again" >>
                        ;;
                    4)
                        echo "Sitename already exists-Please try again"
                        echo "PROMPT: Sitename already exists-Please try again" >> $fi
                        ;;
                    5)
                        echo "Sitename must begin with Alpha Character-Please try agai
                        echo "PROMPT: Sitename must begin with Alpha Character-Please
                        ;;
                    6)
                        echo "Sitename contains invalid characters-Please try again"
                        echo "PROMPT: Sitename contains invalid characters-Please try
                        ;;
                    *)
```

```
                    echo "Invalid choice-Please try again"
                    echo "PROMPT: Invalid choice-Please try again" >> $file1
                    ;;
            esac
        done
        break
        ;;
    N | n | no | NO)
        echo "0" > /usr/ava/install/.rename_sites
        new_sites=0
        i=1
        while [ "$i" -le $rdxnum ]
        do
            if [ "$i" -le 9 ]
            then
                echo "office0${i}" >> /usr/ava/install/.site_names
            else
                echo "office${i}" >> /usr/ava/install/.site_names
            fi
            i=`expr $i + 1`
        done
        break
        ;;
    *)
        echo "Invalid choice-Please try again"
        echo "PROMPT: Invalid choice-Please try again" >> $file1
        continue
    esac
done
/usr/ava/install/hialloc.mla $rdxnum
rm -f /usr/ava/screens/rdx31/cnfg/.QUAD*
rm -f /usr/ava/screens/rdx310/cnfg/.QUAD*
/usr/ava/install/query_nodes 1 $rdxnum 0 $file1
/usr/ava/install/config_FEPS $rdxnum
/usr/ava/install/config_ws_3
/usr/ava/install/config_lprs
echo "Copying Reports, Commands, Queries..."
echo "PROMPT: Copying Reports, Commands, Queries..." >> $file1
/usr/ava/install/copy_query $rdxnum
/usr/ava/install/copy_mla_cmds $rdxnum
/usr/ava/install/activate_sites
ws_number=`cat /usr/ava/install/.ws_number`
if [ "$ws_number" -ne 0 ]
then
    echo " "
    echo "Creating screen text files..."
    echo "PROMPT: Creating screen text files..." >> $file1
    cp /usr/ava/screens/common/wait /usr/gsd/screen/assemble
    cp /usr/ava/screens/common/logoff /usr/gsd/screen/assemble
    /usr/ava/install/build_scr $rdxnum
fi Module Name is ../screens/make_screens rm -f ed200
rename=`cat /usr/ava/install/.rename_sites`
rdx=$1
i=1
while read rdx1 type bay growth name
do
    cd /usr/ava/screens
    if [ "$i" -ge "$rdx" ]
    then
        if [ $type -eq 3 ]
        then
            cat ./alarm_summary/33/alarm.$i >> /usr/gsd/screen/text/alarm.scr
            cd ./rdx33
            make_screens $rdx1 $bay $growth $name
```

```
            make_SR $rdx1 $bay $name
        elif [ $type -eq 1 ]
        then
            cat ./alarm_summary/31/alarm.$i >> /usr/gsd/screen/text/alarm.scr
            cd ./rdx31
            make_screens $rdx1 $bay $growth $name
            make_SR $rdx1 $bay $name
        else
            cat ./alarm_summary/310/alarm.$i >> /usr/gsd/screen/text/alarm.scr
            cd ./rdx310
            make_screens $rdx1 $bay $growth $name
            make_SR $rdx1 $bay $name
        fi
        if [ "$rename" -eq 1 ]
        then
            cd ..
            if [ "$i" -le 9 ]
            then
                echo "s/office0${i}/$name/g" >> ed200
            else
                echo "s/office${i}/$name/g" >> ed200
            fi
            echo "$name" > x200.tmp
            tr a-z A-Z < x200.tmp > x2001.tmp
            capname=`cat x2001.tmp`
            if [ "$i" -le 9 ]
            then
                echo "s/OFFICE0${i}/${capname}/g" >> ed200
            else
                echo "s/OFFICE${i}/${capname}/g" >>. ed200
            fi
        fi
    fi
    i=`expr $i + 1`
done < /usr/ava/screens/rdx_cnfg.parms
cd /usr/ava/screens
if [ "$rename" -eq 1 ]
then
    cp /usr/gsd/screen/text/alarm.scr /tmp/alarm.tmp
    sed -f ed200 /tmp/alarm.tmp > /usr/gsd/screen/text/alarm.scr
    rm /tmp/alarm.tmp x200.tmp x2001.tmp ed200
fi Module Name is ../screens/rdx33/make_screens touch /usr/ava/screens/rdx33/.scrs_present
rdx1=$1
bay=$2
growth=$3
name=$4
if [ "$growth" = "r" ]
then
    if [ "$bay" -eq 0 ]
    then
        cp r3b1.64.rg r3b1.ori
    elif [ "$bay" -eq 1 ]
    then
        cp r3b1.64.3rg r3b1.ori
    elif [ "$bay" -eq 2 ]
    then
        cp r3b1.128.rg r3b1.ori
    elif [ "$bay" -eq 3 ]
    then
        cp r3b1.128.3rg r3b1.ori
    elif [ "$bay" -eq 4 ]
    then
        cp r3b1.256.rg r3b1.ori
```

```
            elif [ "$bay" -eq 5 ]
            then
                cp r3b1.256.srg r3b1.ori
            elif [ "$bay" -eq 7 ]
            then
                cp r3b1.512.rg r3b1.ori
            elif [ "$bay" -eq 8 ]
            then
                cp r3b1.512.srg r3b1.ori
            elif [ "$bay" -eq 13 ]
            then
                cp r3b1.1024.rg r3b1.ori
            else
                cp r3b1.2048.rg r3b1.ori
            fi
        else
            if [ "$bay" -eq 0 ]
            then
                cp r3b1.64.lg r3b1.ori
            elif [ "$bay" -eq 1 ]
            then
                cp r3b1.64.3lg r3b1.ori
            elif [ "$bay" -eq 2 ]
            then
                cp r3b1.128.lg r3b1.ori
            elif [ "$bay" -eq 3 ]
            then
                cp r3b1.128.3lg r3b1.ori
            elif [ "$bay" -eq 4 ]
            then
                cp r3b1.256.lg r3b1.ori
            elif [ "$bay" -eq 5 ]
            then
                cp r3b1.256.slg r3b1.ori
            elif [ "$bay" -eq 7 ]
            then
                cp r3b1.512.lg r3b1.ori
            elif [ "$bay" -eq 8 ]
            then
                cp r3b1.512.slg r3b1.ori
            elif [ "$bay" -eq 13 ]
            then
                cp r3b1.1024.lg r3b1.ori
            else
                cp r3b1.2048.lg r3b1.ori
            fi
        fi
make_bay1 $rdx1 $name
if [ "$bay" -eq 0 ]
then
    make_cxxx1 $rdx1 1 1 01 $name
    make_pxx21c $rdx1 1  $name
    make_pxx64 $rdx1 2   $name
    make_ixx11 $rdx1 2 04 1 $name
    make_rsp11 $rdx1 1   $name
    make_rsp11 $rdx1 2 $name
    make_axxx1 $rdx1 1 3 $name
fi
if [ "$bay" -eq 1 ]
then
    make_cxxx1 $rdx1 3 1 07 $name
    make_pxx64 $rdx1 2   $name
    make_pxx21c $rdx1 3  $name
    make_ixx11 $rdx1 2 04 1 $name
    make_rsp11 $rdx1 1   $name
```

```
        make_rsp11 $rdx1 2 $name
        make_rsp11 $rdx1 3 $name
        make_axxx1 $rdx1 1 1 $name
fi
if [ "$bay" -eq 2 ]
then
        make_cxxx1 $rdx1 1 1 01 $name
        make_pxx21c $rdx1 1  $name
        make_pxx64 $rdx1 2  $name
        make_ixx11 $rdx1 2 04 1 $name
        make_ixx11 $rdx1 2 06 3 $name
        make_rsp11 $rdx1 1 $name
        make_rsp11 $rdx1 2 $name
        make_axxx1 $rdx1 1 3 $name
fi
if [ "$bay" -eq 3 ]
then
        make_cxxx1 $rdx1 3 1 07 $name
        make_pxx21 $rdx1 2  $name
        make_pxx21c $rdx1 3  $name
        make_ixx11 $rdx1 2 04 1 $name
        make_ixx11 $rdx1 2 06 3 $name
        make_rsp10 $rdx1 1  $name
        make_rsp11 $rdx1 2 $name
        make_rsp11 $rdx1 3 $name
        make_axxx1 $rdx1 1 1 $name
fi
if [ "$bay" -eq 4 ]
then
        make_cxxx1 $rdx1 3 1 07 $name
        make_cxxx1 $rdx1 3 3 09 $name
        make_pxx21 $rdx1 2 $name
        make_pxx21c $rdx1 3  $name
        make_pxx21 $rdx1 4 $name
        make_ixx11 $rdx1 2 04 1 $name
        make_ixx11 $rdx1 2 06 3 $name
        make_ixx11 $rdx1 4 10 1 $name
        make_ixx11 $rdx1 4 12 3 $name
        make_rsp10 $rdx1 1  $name
        make_rsp11 $rdx1 2 $name
        make_rsp11 $rdx1 3 $name
        make_rsp11 $rdx1 4 $name
        make_axxx1 $rdx1 1 1 $name
fi
if [ "$bay" -eq 5 ]
then
        make_cxxx1 $rdx1 3 1 07 $name
        make_cxxx1 $rdx1 3 3 09 $name
        make_pxx21 $rdx1 2  $name
        make_pxx21c $rdx1 3  $name
        make_pxx21 $rdx1 4 $name
        make_ixx11 $rdx1 2 04 1 $name
        make_ixx11 $rdx1 2 06 3 $name
        make_ixx11 $rdx1 4 10 1 $name
        make_ixx11 $rdx1 4 12 3 $name
        make_rsp11 $rdx1 1  $name
        make_rsp11 $rdx1 2 $name
        make_rsp11 $rdx1 3 $name
        make_rsp11 $rdx1 4 $name
        make_aps1 $rdx1 $bay $name
fi
if [ "$bay" -eq 7 ]
then
        make_cxxx1 $rdx1 3 1 07 $name
        make_cxxx1 $rdx1 3 3 09 $name
```

```
    make_cxxx1 $rdx1 6 1 16 $name
    make_cxxx1 $rdx1 6 3 18 $name
    make_pxx21 $rdx1 2  $name
    make_pxx21c $rdx1 3  $name
    make_pxx21 $rdx1 4  $name
    make_pxx21 $rdx1 5  $name
    make_pxx21c $rdx1 6  $name
    make_pxx21 $rdx1 7  $name
    make_ixx11 $rdx1 2 04 1 $name
    make_ixx11 $rdx1 2 06 3 $name
    make_ixx11 $rdx1 4 10 1 $name
    make_ixx11 $rdx1 4 12 3 $name
    make_ixx11 $rdx1 5 13 1 $name
    make_ixx11 $rdx1 5 15 3 $name
    make_ixx11 $rdx1 7 19 1 $name
    make_ixx11 $rdx1 7 21 3 $name
    make_rsp10 $rdx1 1  $name
    make_rsp11 $rdx1 2 $name
    make_rsp11 $rdx1 3 $name
    make_rsp11 $rdx1 4 $name
    make_rsp11 $rdx1 5 $name
    make_rsp11 $rdx1 6 $name
    make_rsp11 $rdx1 7 $name
    make_axxx1 $rdx1 1 1 $name
fi
if [ "$bay" -eq 8 ]
then
    make_cxxx1 $rdx1 3 1 07 $name
    make_cxxx1 $rdx1 3 3 09 $name
    make_cxxx1 $rdx1 6 1 16 $name
    make_cxxx1 $rdx1 6 3 18 $name
    make_pxx21 $rdx1 2  $name
    make_pxx21c $rdx1 3  $name
    make_pxx21 $rdx1 4  $name
    make_pxx21 $rdx1 5  $name
    make_pxx21c $rdx1 6  $name
    make_pxx21 $rdx1 7  $name
    make_ixx11 $rdx1 2 04 1 $name
    make_ixx11 $rdx1 2 06 3 $name
    make_ixx11 $rdx1 4 10 1 $name
    make_ixx11 $rdx1 4 12 3 $name
    make_ixx11 $rdx1 5 13 1 $name
    make_ixx11 $rdx1 5 15 3 $name
    make_ixx11 $rdx1 7 19 1 $name
    make_ixx11 $rdx1 7 21 3 $name
    make_rsp11 $rdx1 1  $name
    make_rsp11 $rdx1 2 $name
    make_rsp11 $rdx1 3 $name
    make_rsp11 $rdx1 4 $name
    make_rsp11 $rdx1 5 $name
    make_rsp11 $rdx1 6 $name
    make_rsp11 $rdx1 7 $name
    make_aps1 $rdx1 $bay $name
fi
if [ "$bay" -eq 13 ]
then
    make_cxxx1 $rdx1 3 1 07 $name
    make_cxxx1 $rdx1 3 3 09 $name
    make_cxxx1 $rdx1 6 1 16 $name
    make_cxxx1 $rdx1 6 3 18 $name
    make_cxxx1 $rdx1 9 1 25 $name
    make_cxxx1 $rdx1 9 3 27 $name
    make_cxxx1 $rdx1 12 1 34 $name
    make_cxxx1 $rdx1 12 3 36 $name
    make_pxx21 $rdx1 2  $name
```

```
        make_pxx21c $rdx1 3   $name
        make_pxx21  $rdx1 4   $name
        make_pxx21  $rdx1 5   $name
        make_pxx21c $rdx1 6   $name
        make_pxx21  $rdx1 7   $name
        make_pxx21  $rdx1 8   $name
        make_pxx21c $rdx1 9   $name
        make_pxx21  $rdx1 10  $name
        make_pxx21  $rdx1 11  $name
        make_pxx21c $rdx1 12  $name
        make_pxx21  $rdx1 13  $name
        make_ixx11  $rdx1 2  04 1 $name
        make_ixx11  $rdx1 2  06 3 $name
        make_ixx11  $rdx1 4  10 1 $name
        make_ixx11  $rdx1 4  12 3 $name
        make_ixx11  $rdx1 5  13 1 $name
        make_ixx11  $rdx1 5  15 3 $name
        make_ixx11  $rdx1 7  19 1 $name
        make_ixx11  $rdx1 7  21 3 $name
        make_ixx11  $rdx1 8  22 1 $name
        make_ixx11  $rdx1 8  24 3 $name
        make_ixx11  $rdx1 10 28 1 $name
        make_ixx11  $rdx1 10 30 3 $name
        make_ixx11  $rdx1 11 31 1 $name
        make_ixx11  $rdx1 11 33 3 $name
        make_ixx11  $rdx1 13 37 1 $name
        make_ixx11  $rdx1 13 39 3 $name
        make_rsp11  $rdx1 1   $name
        make_rsp11  $rdx1 2   $name
        make_rsp11  $rdx1 3   $name
        make_rsp11  $rdx1 4   $name
        make_rsp11  $rdx1 5   $name
        make_rsp11  $rdx1 6   $name
        make_rsp11  $rdx1 7   $name
        make_rsp11  $rdx1 8   $name
        make_rsp11  $rdx1 9   $name
        make_rsp11  $rdx1 10  $name
        make_rsp11  $rdx1 11  $name
        make_rsp11  $rdx1 12  $name
        make_rsp11  $rdx1 13  $name
        make_aps1   $rdx1 $bay $name
fi
if [ "$bay" -eq 25 ]
then
        make_cxxx1 $rdx1 3  1 07 $name
        make_cxxx1 $rdx1 3  3 09 $name
        make_cxxx1 $rdx1 6  1 16 $name
        make_cxxx1 $rdx1 6  3 18 $name
        make_cxxx1 $rdx1 9  1 25 $name
        make_cxxx1 $rdx1 9  3 27 $name
        make_cxxx1 $rdx1 12 1 34 $name
        make_cxxx1 $rdx1 12 3 36 $name
        make_cxxx1 $rdx1 15 1 43 $name
        make_cxxx1 $rdx1 15 3 45 $name
        make_cxxx1 $rdx1 18 1 52 $name
        make_cxxx1 $rdx1 18 3 54 $name
        make_cxxx1 $rdx1 21 1 61 $name
        make_cxxx1 $rdx1 21 3 63 $name
        make_cxxx1 $rdx1 24 1 70 $name
        make_cxxx1 $rdx1 24 3 72 $name
        make_pxx21  $rdx1 2   $name
        make_pxx21c $rdx1 3   $name
        make_pxx21  $rdx1 4   $name
        make_pxx21  $rdx1 5   $name
        make_pxx21c $rdx1 6   $name
```

```
make_pxx21  $rdx1 7   $name
make_pxx21  $rdx1 8   $name
make_pxx21c $rdx1 9   $name
make_pxx21  $rdx1 10  $name
make_pxx21  $rdx1 11  $name
make_pxx21c $rdx1 12  $name
make_pxx21  $rdx1 13  $name
make_pxx21  $rdx1 14  $name
make_pxx21c $rdx1 15  $name
make_pxx21  $rdx1 16  $name
make_pxx21  $rdx1 17  $name
make_pxx21c $rdx1 18  $name
make_pxx21  $rdx1 19  $name
make_pxx21  $rdx1 20  $name
make_pxx21c $rdx1 21  $name
make_pxx21  $rdx1 22  $name
make_pxx21  $rdx1 23  $name
make_pxx21c $rdx1 24  $name
make_pxx21  $rdx1 25  $name
make_ixx11  $rdx1 2  04 1 $name
make_ixx11  $rdx1 2  06 3 $name
make_ixx11  $rdx1 4  10 1 $name
make_ixx11  $rdx1 4  12 3 $name
make_ixx11  $rdx1 5  13 1 $name
make_ixx11  $rdx1 5  15 3 $name
make_ixx11  $rdx1 7  19 1 $name
make_ixx11  $rdx1 7  21 3 $name
make_ixx11  $rdx1 8  22 1 $name
make_ixx11  $rdx1 8  24 3 $name
make_ixx11  $rdx1 10 28 1 $name
make_ixx11  $rdx1 10 30 3 $name
make_ixx11  $rdx1 11 31 1 $name
make_ixx11  $rdx1 11 33 3 $name
make_ixx11  $rdx1 13 37 1 $name
make_ixx11  $rdx1 13 39 3 $name
make_ixx11  $rdx1 14 40 1 $name
make_ixx11  $rdx1 14 42 3 $name
make_ixx11  $rdx1 16 46 1 $name
make_ixx11  $rdx1 16 48 3 $name
make_ixx11  $rdx1 17 49 1 $name
make_ixx11  $rdx1 17 51 3 $name
make_ixx11  $rdx1 19 55 1 $name
make_ixx11  $rdx1 19 57 3 $name
make_ixx11  $rdx1 20 58 1 $name
make_ixx11  $rdx1 20 60 3 $name
make_ixx11  $rdx1 22 64 1 $name
make_ixx11  $rdx1 22 66 3 $name
make_ixx11  $rdx1 23 67 1 $name
make_ixx11  $rdx1 23 69 3 $name
make_ixx11  $rdx1 25 73 1 $name
make_ixx11  $rdx1 25 75 3 $name
make_rsp11  $rdx1 1   $name
make_rsp11  $rdx1 2   $name
make_rsp11  $rdx1 3   $name
make_rsp11  $rdx1 4   $name
make_rsp11  $rdx1 5   $name
make_rsp11  $rdx1 6   $name
make_rsp11  $rdx1 7   $name
make_rsp11  $rdx1 8   $name
make_rsp11  $rdx1 9   $name
make_rsp11  $rdx1 10  $name
make_rsp11  $rdx1 11  $name
make_rsp11  $rdx1 12  $name
make_rsp11  $rdx1 13  $name
make_rsp11  $rdx1 14  $name
```

```
        make_rsp11 $rdx1 15 $name
        make_rsp11 $rdx1 16 $name
        make_rsp11 $rdx1 17 $name
        make_rsp11 $rdx1 18 $name
        make_rsp11 $rdx1 19 $name
        make_rsp11 $rdx1 20  $name
        make_rsp11 $rdx1 21 $name
        make_rsp11 $rdx1 22 $name
        make_rsp11 $rdx1 23 $name
        make_rsp11 $rdx1 24 $name
        make_rsp11 $rdxI 25 $name
        make_aps1 $rdx1 $bay $name
fi
```

Module Name is ../screens/rdx33/make_SR

```
rdxnum=$1
bay=$2
name=$3
if [ "$rdxnum" -ge 1 -a "$rdxnum" -le 9 ]
then
    site_name="SSO${rdxnum}"
else
    site_name="SS${rdxnum}"
fi
if [ $bay -eq 0 ]
then
    /usr/ava/super_registers/33/make_64 $site_name $name $rdxnum
elif [ $bay -eq 1 ]
then
    /usr/ava/super_registers/33/make_64.3 $site_name $name $rdxnum
elif [ $bay -eq 2 ]
then
    /usr/ava/super_registers/33/make_128 $site_name $name $rdxnum
elif [ $bay -eq 3 ]
then
    /usr/ava/super_registers/33/make_128.3 $site_name $name $rdxnum
elif [ $bay -eq 4 ]
then
    /usr/ava/super_registers/33/make_256 $site_name $name $rdxnum
elif [ $bay -eq 5 ]
then
    /usr/ava/super_registers/33/make_256.s $site_name $name $rdxnum
elif [ $bay -eq 7 ]
then
    /usr/ava/super_registers/33/make_512 $site_name $name $rdxnum
elif [ $bay -eq 8 ]
then
    /usr/ava/super_registers/33/make_512.s $site_name $name $rdxnum
elif [ $bay -eq 13 ]
then
    /usr/ava/super_registers/33/make_1024 $site_name $name $rdxnum
else
    /usr/ava/super_registers/33/make_2048 $site_name $name $rdxnum
fi
```

Module Name is ../screens/rdx31/make_screens

```
touch /usr/ava/screens/rdx31/.scrs_present
rdx1=$1
bay=$2
growth=$3
name=$4
if [ "$growth"  = "r" ]
```

```
                then
                    if [ "$bay" -eq 0 ]
                    then
                        cp rlbl.8.rg rlbl.ori
                    elif [ "$bay" -eq 1 ]
                    then
                        cp rlbl.16.rg rlbl.ori
                    elif [ "$bay" -eq 2 ]
                    then
                        cp rlbl.32.rg rlbl.ori
                    elif [ "$bay" -eq 4 ]
                    then
                        cp rlbl.64.rg rlbl.ori
                    elif [ "$bay" -eq 6 ]
                    then
                        cp rlbl.128.rg rlbl.ori
                    else
                        cp rlbl.256.rg rlbl.ori
                    fi
                else
                    if [ "$bay" -eq 0 ]
                    then
                        cp rlbl.8.lg rlbl.ori
                    elif [ "$bay" -eq 1 ]
                    then
                        cp rlbl.16.lg rlbl.ori
                    elif [ "$bay" -eq 2 ]
                    then
                        cp rlbl.32.lg rlbl.ori
                    elif [ "$bay" -eq 4 ]
                    then
                        cp rlbl.64.lg rlbl.ori
                    elif [ "$bay" -eq 6 ]
                    then
                        cp rlbl.128.lg rlbl.ori
                    else
                        cp rlbl.256.lg rlbl.ori
                    fi
                fi
                make_bay $rdxl $name
                if [ "$bay" -eq 0 ]
                then
                    cp rltlll.ori.16 rltlll.ori
                    cp rltlllh.ori.16 rltlllh.ori
                    cp rlpll3.ori.2 rlpll3.ori
                    cp rlpll3h.ori.2 rlpll3h.ori
                    make_rsp2-3 $rdxl 8 $name
                    make_rsp.apu $rdxl 2 $name
                    make_rsp1-1 $rdxl 3 $name
                    make_axll $rdxl $name
                    make_txxx $rdxl 8 2 $name
                    make_txxx $rdxl 8 2 $name
                    make_pxxx $rdxl 8 $name
                    make_pxxx $rdxl 2 $name
                    make_io_bay $rdxl 3 $name
                fi
                if [ "$bay" -eq 1 ]
                then
                    cp rltlll.ori.16 rltlll.ori
                    cp rltlllh.ori.16 rltlllh.ori
                    cp rlpll3.ori.2 rlpll3.ori
                    cp rlpll3h.ori.2 rlpll3h.ori
                    make_rsp2-3 $rdxl 8 $name
                    make_rsp.apu $rdxl 2 $name
                    make_rsp1-2 $rdxl 3 $name
```

```
        make_ax11 $rdx1 $name
        make_txxx $rdx1 8 2 $name
        make_txxx $rdx1 2 2 $name
        make_pxxx $rdx1 8 $name
        make_pxxx $rdx1 2 $name
        make_io_bay $rdx1 3 $name
fi
if [ "$bay" -eq 2 ]
then
        cp rlt111.ori.32 rlt111.ori
        cp rlt111h.ori.32 rlt111h.ori
        cp rlp113.ori.2 rlp113.ori
        cp rlp113h.ori.2 rlp113h.ori
        make_rsp2-3 $rdx1 8 $name
        make_rsp.apu $rdx1 2 $name
        make_rsp1-4 $rdx1 3 $name
        make_ax11 $rdx1 $name
        make_txxx $rdx1 8 2 $name
        make_txxx $rdx1 2 2 $name
        make_pxxx $rdx1 8 $name
        make_pxxx $rdx1 2 $name
        make_io_bay $rdx1 3 $name
fi
if [ "$bay" -eq 4 ]
then
        cp rlt111.ori.64 rlt111.ori
        cp rlt111h.ori.64 rlt111h.ori
        cp rlp113.ori.2 rlp113.ori
        cp rlp113h.ori.2 rlp113h.ori
        make_rsp.aps $rdx1 1 $name
        make_rsp2-3 $rdx1 8 $name
        make_rsp2-3 $rdx1 2 $name
        make_rsp1-4 $rdx1 3 $name
        make_rsp1-4 $rdx1 4 $name
        make_lx11 $rdx1 $name
        make_sx12 $rdx1 $name
        make_dx13 $rdx1 $name
        make_txxx $rdx1 8 2 $name
        make_txxx $rdx1 2 2 $name
        make_pxxx $rdx1 8 $name
        make_pxxx $rdx1 2 $name
        make_io_bay $rdx1 3 $name
        make_io_bay $rdx1 4 $name
fi
if [ "$bay" -eq 6 ]
then
        cp rlt111.ori.128 rlt111.ori
        cp rlt111h.ori.128 rlt111h.ori
        cp rlp113.ori.2 rlp113.ori
        cp rlp113h.ori.2 rlp113h.ori
        make_rsp.aps $rdx1 1 $name
        make_rsp2-3 $rdx1 8 $name
        make_rsp2-3 $rdx1 2 $name
        make_rsp1-4 $rdx1 3 $name
        make_rsp1-4 $rdx1 4 $name
        make_rsp1-4 $rdx1 5 $name
        make_rsp1-4 $rdx1 6 $name
        make_lx11 $rdx1 $name
        make_sx12 $rdx1 $name
        make_dx13 $rdx1 $name
        make_txxx $rdx1 8 2 $name
        make_txxx $rdx1 2 2 $name
        make_pxxx $rdx1 8 $name
        make_pxxx $rdx1 2 $name
        make_io_bay $rdx1 3 $name
```

```
        make_io_bay $rdx1 4 $name
        make_io_bay $rdx1 5 $name
        make_io_bay $rdx1 6 $name
fi
if [ "$bay" -eq 13 ]
then
        cp rlt111.ori.128 rlt111.ori
        cp rlt111h.ori.128 rlt111h.ori
        cp rlp113.ori.6 rlp113.ori
        cp rlp113h.ori.6 rlp113h.ori
        make_rsp.aps $rdx1 1 $name
        make_rsp2-4 $rdx1 9 $name
        make_rsp2-4 $rdx1 8 $name
        make_rsp2-4 $rdx1 7 $name
        make_rsp2-4 $rdx1 2 $name
        make_rsp1-4 $rdx1 3 $name
        make_rsp1-4 $rdx1 4 $name
        make_rsp1-4 $rdx1 5 $name
        make_rsp1-4 $rdx1 6 $name
        make_rsp1-4 $rdx1 10 $name
        make_rsp1-4 $rdx1 11 $name
        make_rsp1-4 $rdx1 12 $name
        make_rsp1-4 $rdx1 13 $name
        make_lx11 $rdx1 $name
        make_sx12 $rdx1 $name
        make_dx13 $rdx1 $name
        make_txxx $rdx1 2 2 $name
        make_txxx $rdx1 2 4 $name
        make_txxx $rdx1 7 2 $name
        make_txxx $rdx1 7 4 $name
        make_txxx $rdx1 8 2 $name
        make_txxx $rdx1 8 4 $name
        make_txxx $rdx1 9 2 $name
        make_txxx $rdx1 9 4 $name
        make_pxxx $rdx1 2 $name
        make_pxxx $rdx1 7 $name
        make_pxxx $rdx1 8 $name
        make_pxxx $rdx1 9 $name
        make_io_bay $rdx1 3 $name
        make_io_bay $rdx1 4 $name
        make_io_bay $rdx1 5 $name
        make_io_bay $rdx1 6 $name
        make_io_bay $rdx1 10 $name
        make_io_bay $rdx1 11 $name
        make_io_bay $rdx1 12 $name
        make_io_bay $rdx1 13 $name
fi Module Name is ../screens/rdx31/make_SR rdxnum=$1
bay=$2
name=$3
if [ "$rdxnum" -ge 1 -a "$rdxnum" -le 9 ]
then
        site_name="SS0${rdxnum}"
else
        site_name="SS${rdxnum}"
fi
if [ $2 -eq 0 ]
then
        /usr/ava/super_registers/31/make_8 $site_name $name $rdxnum
elif [ $2 -eq 1 ]
then
```

```
        /usr/ava/super_registers/31/make_16 $site_name $name $rdxnum
elif [ $2 -eq 2 ]
then
        /usr/ava/super_registers/31/make_32 $site_name $name $rdxnum
elif [ $2 -eq 4 ]
then
        /usr/ava/super_registers/31/make_64 $site_name $name $rdxnum
elif [ $2 -eq 6 ]
then
        /usr/ava/super_registers/31/make_128 $site_name $name $rdxnum
elif [ $2 -eq 13 ]
then
        /usr/ava/super_registers/31/make_256 $site_name $name $rdxnum
elif [ $2 -eq 19 ]
then
        /usr/ava/super_registers/31/make_512 $site_name $name $rdxnum
else
        /usr/ava/super_registers/31/make_1024 $site_name $name $rdxnum
fi
```

Module Name is ../screens/rdx310/make_screens

```
touch /usr/ava/screens/rdx310/.scrs_present
rdx1=$1
bay=$2
growth=$3
name=$4
if [ "$growth" = "r" ]
then
    if [ "$bay" -eq 0 ]
    then
        cp r0b1.8.rg r0b1.ori
    elif [ "$bay" -eq 1 ]
    then
        cp r0b1.16.rg r0b1.ori
    elif [ "$bay" -eq 2 ]
    then
        cp r0b1.32.rg r0b1.ori
    else
        cp r0b1.64.rg r0b1.ori
    fi
else
    if [ "$bay" -eq 0 ]
    then
        cp r0b1.8.lg r0b1.ori
    elif [ "$bay" -eq 1 ]
    then
        cp r0b1.16.lg r0b1.ori
    elif [ "$bay" -eq 2 ]
    then
        cp r0b1.32.lg r0b1.ori
    else
        cp r0b1.64.lg r0b1.ori
    fi
fi
make_bay $rdx1 $name
if [ "$bay" -eq 0 ]
then
    cp r0t111.ori.16 r0t111.ori
    cp r0t111h.ori.16 r0t111h.ori
    cp r0p113.ori.16 r0p113.ori
    cp r0p113h.ori.16 r0p113h.ori
    make_rsp.apu $rdx1 2 $name
    make_rsp1-1 $rdx1 3 $name
    make_ax11 $rdx1 $name
```

```
            make_txxx $rdx1 2 2 $name
            make_txxx $rdx1 2 4 $name
            make_pxxx $rdx1 2 $name
            make_io_bay $rdx1 3 $name
fi
if [ "$bay" -eq 1 ]
then
            cp r0t111.ori.16 r0t111.ori
            cp r0t111h.ori.16 r0t111h.ori
            cp r0p113.ori.16 r0p113.ori
            cp r0p113h.ori.16 r0p113h.ori
            make_rsp.apu $rdx1 2 $name
            make_rsp1-2 $rdx1 3 $name
            make_ax11 $rdx1 $name
            make_txxx $rdx1 2 2 $name
            make_txxx $rdx1 2 4 $name
            make_pxxx $rdx1 2 $name
            make_io_bay $rdx1 3 $name
fi
if [ "$bay" -eq 2 ]
then
            cp r0t111.ori.32 r0t111.ori
            cp r0t111h.ori.32 r0t111h.ori
            cp r0p113.ori.32 r0p113.ori
            cp r0p113h.ori.32 r0p113h.ori
            make_rsp.apu $rdx1 2 $name
            make_rsp1-4 $rdx1 3 $name
            make_ax11 $rdx1 $name
            make_txxx $rdx1 2 2 $name
            make_txxx $rdx1 2 4 $name
            make_pxxx $rdx1 2 $name
            make_io_bay $rdx1 3 $name
fi
if [ "$bay" -eq 4 ]
then
            make_rsp1-3 $rdx1 1 $name
            make_rsp1-4 $rdx1 2 $name
            make_rsp2-4 $rdx1 3 $name
            make_rsp2-4 $rdx1 4 $name
            make_rsp2-4 $rdx1 5 $name
            make_rsp2-4 $rdx1 6 $name
            make_rsp1-4 $rdx1 7 $name
            make_lx11 $rdx1 $name
            make_sx12 $rdx1 $name
            make_dx13 $rdx1 $name
            make_t1-3 $rdx1 3 2 $name
            make_t1-3 $rdx1 3 4 $name
            make_t2-4 $rdx1 4 2 $name
            make_t2-4 $rdx1 4 4 $name
            make_t1-3 $rdx1 5 2 $name
            make_t1-3 $rdx1 5 4 $name
            make_t2-4 $rdx1 6 2 $name
            make_t2-4 $rdx1 6 4 $name
            make_pxxx.6 $rdx1 3 $name
            make_pxxx.6 $rdx1 4 $name
            make_pxxx.4 $rdx1 5 $name
            make_pxxx.4 $rdx1 6 $name
            make_io_bay $rdx1 2 $name
            make_io_bay $rdx1 7 $name
fi Module Name is ../screens/rdx310/make_SR rdxnum=$1
bay=$2
name=$3
```

```
if [ "$rdxnum" -ge 1 -a "$rdxnum" -le 9 ]
then
    site_name="SS0${rdxnum}"
else
    site_name="SS${rdxnum}"
fi
if [ $2 -eq 0 ]
then
    /usr/ava/super_registers/310/make_8 $site_name $name $rdxnum
elif [ $2 -eq 1 ]
then
    /usr/ava/super_registers/310/make_16 $site_name $name $rdxnum
elif [ $2 -eq 2 ]
then
    /usr/ava/super_registers/310/make_32 $site_name $name $rdxnum
elif [ $2 -eq 4 ]
then
    /usr/ava/super_registers/310/make_64 $site_name $name $rdxnum
elif [ $2 -eq 6 ]
then
    /usr/ava/super_registers/310/make_128 $site_name $name $rdxnum
else
    /usr/ava/super_registers/310/make_256 $site_name $name $rdxnum
fi
```

What is claimed is:

1. A method for automatically monitoring and configuring a commununcations network comprising a plurality of components, the method comprising the steps of:
- associating a plurality of user templates with a plurality of levels of integration of the components of the communications network so that a user template associates with each one of said levels of integration;
- associating each one of said user templates with other of said user templates to permit error conditions existing at one of said components to indicate a plurality of error signals on predetermined ones of said user templates;
- communicating instructions and queries through a display, said instructions and queries associated with said error signals and said levels of integration;
- altering said user templates and said levels of integration in response to said instructions and said error signals;
- configuring said user templates to monitor the communications network in response to said instructions; and
- displaying said altered user templates on said display.

2. A system for automatically monitoring and configuring a communications network comprising a plurality of components, comprising:
- a plurality of user templates associated with a plurality of levels of integration of the components of the communications network so that a user template associates with each one of said levels of integration;
- means for associating each one of said user templates with other of said user templates to permit error conditions existing at one of said components to indicate a plurality of error signals on predetermined ones of said user templates;
- a set of instructions and queries for communicating through a display, said instructions and queries associated with said error signals and said levels of integration;
- means for altering said user templates and said levels of integration in response to said instructions;
- means for configuring said user templates to monitor the communications network in response to said instructions; and
- display means for displaying said altered user templates and said altered levels of integration.

3. A method for automatically monitoring and configuring a communications network comprising a plurality of components, the method comprising the steps of:
- associating each one of a plurality of user outputs with a plurality of predetermined sets of the components of the communications network so that at least one user output associates with at least one of said predetermined sets;
- associating certain ones of said user outputs with other ones of said user outputs to permit an error condition existing at one of the components to indicate a plurality of error signals on selected ones of said user outputs;
- communicating instructions and queries through a display, said instructions and queries associated with said error signals and said selected ones of said user outputs;
- altering said selected ones of said user outputs in response to said instructions;
- configuring said plurality of user outputs to monitor the communications network in response to said instructions; and
- displaying said altered user outputs on said display.

4. A system for automatically monitoring and configuring a communications network comprising a plurality of components, comprising:
- a plurality of user outputs, each associated with a plurality of predetermined sets of the components of the communications network so that at least one user output associates with at least one of said predetermined sets;
- means for associating certain ones of said user outputs with other ones of said user outputs to permit an error condition existing at one of the components to indicate a plurality of error signals on selected ones of said user outputs;

a set of instructions and queries for communicating through a display, said instructions and queries associated with said error signals and said selected ones of said user outputs;

means for altering said selected ones of said user outputs in response to said instructions;

means for configuring said plurality of user outputs to monitor the communications network in response to said instructions; and display means for displaying said altered selected ones of said user outputs.

5. A method for automatically monitoring and configuring a communications network comprising a plurality of components, the method comprising the steps of:

associating a plurality of user outputs with a plurality of levels of integration of the components of the communications network so that at least one user output associates with each one of said levels of integration;

communicating instructions and queries through a display, said instructions and queries associated with said levels of integration;

altering said user outputs and said levels of integration in response to said instructions; and configuring said levels of integration to monitor the communications network in response to said instructions;

displaying said altered user outputs and said altered levels of integration.

6. An automatic monitoring and configuring system for a communications network comprising a plurality of components, comprising:

a plurality of user outputs associated with a plurality of levels of integration of the components of the communications network so that at least one user output associates with each one of said levels of integration;

a set of instructions and queries for communicating through a display, said instructions and queries associated with said levels of integration;

means for altering said user outputs and said levels of integration in response to said instructions; and means for configuring said levels of integration to monitor the communications network in response to said instructions;

display means for displaying said altered user outputs and said altered levels of integration.

7. A method of generating a computer monitor representation of a communications network having a plurality of sub-components and higher components for use in monitoring and controlling said communucations network, comprising the steps of:

predefining a plurality of templates, one for each possible sub-component and higher component of the communications network, each of said templates defining at least one characteristic of a portion of the communications network;

interrogating a user to supply responses describing a predetermined set of characteristics of the communications network from a selection of possible characteristics defined by said templates;

generating a database from which any desired representation of the communications network may be displayed based on the responses to said interrogating step; and displaying a simulation of any portion of the communications network as requested by the user.

8. A system for generating a computer monitor representation of a communications network having a plurality of sub-components and higher components for use in monitoring and controlling said network, comprising:

a plurality of predefined templates, one for each possible sub-component and higher component of the communications network, where each template defines, in software terminology, a system characteristic of an associated portion of the network;

means for interrogating a user to supply responses as to the sub-components and higher components of the communications network from a selection of choices defined by said predefined templates;

a database from which any desired representation of the communications network may be displayed, based on the responses to said interrogating means; and a simulation for displaying any portion of the communications network as requested by said user.

9. A method of monitoring a communications network having a plurality of sub-components and higher components using a computer monitor representation, comprising the steps of:

predefining a plurality of templates, one for each possible sub-component and higher component of the communications network, each one of said templates defining, in software terminology, at least one alarm condition effecting a portion of the communications network;

interrogating a user to supply responses describing the sub-components and higher components of the communications network from a selection of choices defined by said templates;

generating a database, from which any desired representation of the communications network may be displayed, based on said responses to said interrogating step; and displaying a simulation of any portion of the communications network and alarm conditions in that portion.

10. A system for monitoring a communications network having a plurality of sub-components and higher components using a computer monitor representation, comprising:

a plurality of templates for predefining each possible communications network sub-component and higher component, where each template defines at least one network alarm condition;

a set of queries for interrogating a user to supply responses describing the sub-components and higher components of the communications network from a selection of choices defined by said templates;

a database for generating a display of any desired representation of the communications network based on the responses to said set of queries; and a display for responsively displaying a simulation of any alarm conditions.

11. A method of generating a computer monitor representation of a communications network having a plurality of sub-components and higher components for use in monitoring and controlling said communications network, comprising the steps of:

predefining a plurality of templates, one for each possible communications network sub-component and higher component, where each template defines a set of characteristics for a portion of the communications network;

associating certain ones of said plurality of templates with one another to indicate relationships among the communications network sub-components and higher components;

interrogating a user to supply responses as to the sub-components and higher components of the communications network from a selection of choices defined by said templates;

generating a database from which any desired representation of the communications network may be displayed, based on the responses to the interrogating step; and displaying a simulation of any portion of the communications network as requested by said user.

12. A system of generating a computer monitor representation of a communications network having a plurality of sub-components and higher components and for use in monitoring and controlling said communications network, the system comprising:

a plurality of templates for each possible sub-component and higher component of the communications network, where each template defines, in software terminology, a set of characteristics for that portion of the communications network;

means for associating certain ones of said plurality of templates with one another to indicate relationships among said communications network sub-components and higher components;

a plurality of queries for interrogating a user to supply responses as to said sub-components and higher components of the communications network from a selection of choices defined by said templates;

a database for containing data to display any desired representation of the communications network based on the responses to said plurality of queries; and means for displaying a simulation of any portion of the communications network as requested by the user.

* * * * *